(12) United States Patent
Miyahara et al.

(10) Patent No.: US 6,935,099 B2
(45) Date of Patent: Aug. 30, 2005

(54) DETERIORATED STATE EVALUATION DEVICE OF EXHAUST EMISSION CONTROL EQUIPMENT

(75) Inventors: Yasuyuki Miyahara, Wako (JP); Masahiro Sato, Wako (JP); Masaki Ueno, Wako (JP); Kenichi Ohmori, Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 21 days.

(21) Appl. No.: 10/484,817

(22) PCT Filed: Aug. 23, 2002

(86) PCT No.: PCT/JP02/08526

§ 371 (c)(1),
(2), (4) Date: Jan. 30, 2004

(87) PCT Pub. No.: WO03/021090

PCT Pub. Date: Mar. 13, 2003

(65) Prior Publication Data

US 2004/0231322 A1 Nov. 25, 2004

(30) Foreign Application Priority Data

Aug. 31, 2001 (JP) ............................. 2001-264984

(51) Int. Cl.[7] .............................................. F01N 3/00
(52) U.S. Cl. ........................ 60/277; 60/274; 60/276; 60/297
(58) Field of Search ..................... 60/274, 276, 277, 60/297, 311

(56) References Cited

U.S. PATENT DOCUMENTS 6,357,227 B1 * 3/2002 Neufert ....................... 60/309
6,477,830 B2 * 11/2002 Takakura et al. ............. 60/277
6,763,655 B2 * 7/2004 Ueno et al. ................... 60/277

FOREIGN PATENT DOCUMENTS

| JP | 5-272329 | 10/1993 |
| JP | 405256124 | * 10/1993 |
| JP | 7-158425 | 6/1995 |
| JP | 10-159543 | 6/1998 |
| JP | 11-6424 | 1/1999 |
| JP | 1132589 | * 9/2001 |

* cited by examiner

Primary Examiner—Thomas Denion
Assistant Examiner—Diem Tran
(74) Attorney, Agent, or Firm—Arent Fox, PLLC

(57) ABSTRACT

After an engine 1 has started to operate, a state in which a humidity represented by an output of a humidity sensor 19 downstream of a hydrocarbon adsorbent 7 takes a minimum value is sequentially searched for, and a timing at which the humidity changes from the minimum value to a monotonously increasing state is grasped as a timing at which the adsorption of moisture and hydrocarbons by the hydrocarbon adsorbent 7 is saturated. After the engine has started to operate, a parameter representing an integrated amount of moisture given to the hydrocarbon adsorbent 7 by the exhaust gas is sequentially generated, and a deteriorated state of the hydrocarbon adsorbent 7 is evaluated based on the value of the parameter at the timing at which the adsorption is saturated. The deteriorated state of the hydrocarbon absorbent can thus accurately be evaluated by an inexpensive arrangement which employs the humidity sensor 19 disposed downstream of the hydrocarbon adsorbent 7.

36 Claims, 17 Drawing Sheets

DETERIORATED STATE EVALUATION DEVICE OF EXHAUST EMISSION CONTROL EQUIPMENT

CROSS-REFERENCE TO RELATED APPLICATION

This application is a National Stage entry of International Application No. PCT/JP02/08526, filed Aug. 23, 2002, the entire specification claims and drawings of which are incorporated herewith by reference.

TECHNICAL FIELD

The present invention relates to an apparatus for evaluating a deteriorated state of an exhaust gas purifier which has a hydrocarbon adsorbent for adsorbing hydrocarbons contained in exhaust gases emitted from an internal combustion engine.

BACKGROUND ART

Catalytic converters comprising a three-way catalyst, etc. are disposed in the exhaust passages of internal combustion engines for purifying unburned gases such as hydrocarbons (HC), carbon monoxide (CO), nitrogen oxides (NOx), etc. contained in exhaust gases emitted from the engines based on catalytic actions (oxidizing and reducing actions) of the catalytic converters. The catalytic converter of the type described is, however, not sufficiently activated when its temperature is low, such as when the internal combustion engine starts to operate at a low temperature. When the catalytic converter is not sufficiently activated, a large amount of hydrocarbons in particular is emitted from the exhaust emission system.

It is known in the art to place an exhaust gas purifier disposed in the exhaust passage, which may comprise a hydrocarbon adsorbent such as zeolite or a composite combination of a hydrocarbon adsorbent and a three-way catalyst. The hydrocarbon adsorbent has a function to adsorb hydrocarbons in the exhaust gas at relatively low temperatures below 100° C., for example, and operates to release the adsorbed hydrocarbons when heated to a certain temperature in the range from 100 to 250° C., for example.

It has been desired in the art to evaluate a deteriorated state of an exhaust gas purifier in order to determine when to replace the exhaust gas purifier. It has also been desired to evaluate a deteriorated state of an exhaust gas purifier which has a hydrocarbon adsorbent. One known system for evaluating a hydrocarbon adsorbent is disclosed in Japanese laid-open patent publication No. 10-159543, for example. The disclosed system has temperature sensors disposed respectively upstream and downstream of the exhaust gas purifier which has a hydrocarbon adsorbent. The system estimates a temperature downstream of the exhaust gas purifier from the temperature detected by the upstream temperature sensor on the assumption that the hydrocarbon adsorbent is a brand-new one which has not been deteriorated. Based on the difference between the estimated temperature and the temperature detected by the downstream temperature, the system evaluates a deteriorated state of the hydrocarbon adsorbent.

However, the conventional system finds it difficult to evaluate a deteriorated state of the hydrocarbon adsorbent accurately because the temperatures detected by the temperature sensors disposed respectively upstream and downstream of the exhaust gas purifier are susceptible to various factors including the ambient temperature, etc. The system is also disadvantageous from the standpoint of cost as it needs temperature sensors both upstream and downstream of the exhaust gas purifier.

It has also been known in the art to provide a hydrocarbon sensor (HC sensor) disposed downstream of the hydrocarbon adsorbent, directly grasp an adsorbed state (adsorbed quantity or the like) of hydrocarbons adsorbed by the hydrocarbon adsorbent based on an output signal detected by the HC sensor, and evaluate a deteriorated state of the hydrocarbon adsorbent based on the adsorbed state of hydrocarbons. Generally, however, HC sensors react not to all kinds of hydrocarbons that can be adsorbed by the hydrocarbon adsorbent. The adsorbed state of hydrocarbons adsorbed by the hydrocarbon adsorbent as grasped by the HC sensor often does not sufficiently reflect the actual adsorbed state of hydrocarbons. Therefore, it is often difficult to evaluate a deteriorated state of the hydrocarbon adsorbent with accuracy. The HC sensor also makes the entire system disadvantageous as to cost because the HC sensor is relatively expensive.

The applicant of the present application has attempted to develop a technique for evaluating a deteriorated state of a hydrocarbon adsorbent with a humidity sensor disposed downstream of the hydrocarbon adsorbent or humidity sensors disposed respectively downstream and upstream of the hydrocarbon adsorbent. Specifically, according to findings of the inventors of the present application, the hydrocarbon adsorbent is capable of adsorbing not only hydrocarbons contained in exhaust gases, but also moisture contained in exhaust gases. The ability of the hydrocarbon adsorbent to adsorb moisture, i.e., the maximum amount of moisture that can be adsorbed by the hydrocarbon adsorbent, is highly correlated to the ability of the hydrocarbon adsorbent to adsorb hydrocarbons, i.e., the maximum amount of hydrocarbons that can be adsorbed by the hydrocarbon adsorbent. As the hydrocarbon adsorbent progressively deteriorates, both the ability to adsorb moisture and the ability to adsorb hydrocarbons are progressively lowered in the same manner. Furthermore, as described in detail later on, it is possible to grasp the adsorbed state of moisture adsorbed by the hydrocarbon adsorbent by observing an output of the humidity sensor downstream of the hydrocarbon adsorbent or outputs of both the humidity sensors downstream and upstream of the hydrocarbon adsorbent. The humidity sensors are more inexpensive than the HC sensors or the like. Using the above humidity sensors, it is considered possible to evaluate a deteriorated state of the hydrocarbon adsorbent at a relatively low cost.

According to the finding of the inventors, if a humidity sensor is disposed downstream of the hydrocarbon adsorbent, then the humidity (detected humidity) represented by the output of the humidity sensor, i.e., the humidity downstream of the hydrocarbon adsorbent, undergoes a transition after the internal combustion engine has started to operate, as follows: Immediately after the internal combustion engine has started to operate, the moisture contained in the exhaust gases is adsorbed by the hydrocarbon adsorbent, and the humidity downstream of the hydrocarbon adsorbent is basically kept at a substantially constant low level. As the adsorption of moisture by the hydrocarbon adsorbent progresses and becomes saturated, the hydrocarbon adsorbent is no longer capable of adsorbing moisture contained in the exhaust gases, and hence the humidity downstream of the hydrocarbon adsorbent is not adsorbed by the hydrocarbon adsorbent, but increases monotonously to a higher humidity because of moisture contained in the exhaust gases that pass through the hydrocarbon adsorbent. Therefore, the timing at which the humidity downstream of the hydrocarbon adsorbent starts monotonously increasing from a low humidity level, i.e., the changing timing at which the humidity changes to a tendency to increase monotonously, is the timing at which the adsorption of moisture by the hydrocarbon adsorbent becomes saturated, i.e., the timing at which the adsorption of hydrocarbons by the hydrocarbon adsorbent becomes saturated. After the internal combustion engine has started to operate, the integrated amount of moisture supplied to the hydrocarbon adsorbent by the exhaust gases up to the above changing timing, or a value corresponding to the integrated amount of moisture corresponds to the maximum amount of moisture that can be adsorbed by the hydrocarbon adsorbent at present. Therefore, after the internal combustion engine has started to operate, the integrated amount of moisture supplied to the hydrocarbon adsorbent up to the changing timing of the moisture downstream of the hydrocarbon adsorbent, or a value corresponding to the integrated amount of moisture represents a deteriorated state of the hydrocarbon adsorbent.

Therefore, in grasping a deteriorated state of the hydrocarbon adsorbent with the humidity sensor disposed downstream of the hydrocarbon adsorbent, it is important to grasp the changing timing at which the humidity detected by the humidity sensor changes from a lower humidity level to a tendency to increase monotonously to a higher humidity level.

If the hydrocarbon adsorbent is brand-new, then the humidity downstream of the hydrocarbon adsorbent after the internal combustion engine has started to operate is of a substantially constant low level immediately after the internal combustion engine has started to operate, as described above. In such a circumstance, it is relatively easy to grasp the changing timing at which the humidity downstream of the hydrocarbon adsorbent starts increasing monotonously. For example, it is possible to detect, as the changing timing, the time when the humidity detected by the humidity sensor disposed downstream of the hydrocarbon adsorbent increases a slight quantity from the start of operation of the internal combustion engine.

When the hydrocarbon adsorbent has deteriorated to a certain extent, however, the hydrocarbon adsorbent is unable to sufficiently adsorb moisture that is present therearound in the exhaust passage, and the humidity distribution in the exhaust passage tends to vary, before the internal combustion engine starts to operate. In this case, after the internal combustion engine has started to operate, the humidity detected by the humidity sensor is liable to vary. Therefore, even if the time when the humidity detected by the humidity sensor increases a slight quantity from the start of operation of the internal combustion engine is grasped as the changing timing, the grasped changing timing possibly becomes inaccurate.

As described in detail later on, in the case where the humidity sensor is disposed not only downstream of the hydrocarbon adsorbent, but also upstream of the hydrocarbon adsorbent, for grasping the amount of moisture that can be adsorbed by the hydrocarbon adsorbent and evaluating a deteriorated state of the hydrocarbon adsorbent based on the grasped amount of moisture, it is necessary to grasp the changing timing of the humidity detected by the downstream humidity sensor and also the changing timing of the humidity detected by the upstream humidity sensor. However, the above problems which occur when the changing timing of the humidity detected by the downstream humidity sensor is grasped are liable to occur when the changing timing of the humidity detected by the upstream humidity sensor is grasped. The present invention is made according to such background, and is aimed at providing a deteriorated state evaluation device of exhaust emission control equipment for accurately evaluating the deteriorated state of a hydrocarbon adsorbent with an inexpensive arrangement which employs a humidity sensor.

DISCLOSURE OF THE INVENTION

An apparatus for evaluating a deteriorated state of an exhaust gas purifier according to the present invention is available in two aspects. In the first aspect, a humidity sensor is disposed downstream of a hydrocarbon adsorbent. More specifically, in order to achieve the above object, there is provided in accordance with the first aspect of the present invention an apparatus for evaluating a deteriorated state of an exhaust gas purifier disposed in an exhaust passage of an internal combustion engine and having a hydrocarbon adsorbent for adsorbing hydrocarbons in an exhaust gas flowing through the exhaust passage, comprising a humidity sensor disposed downstream of said hydrocarbon adsorbent for outputting a signal depending on the humidity of said exhaust gas, means for sequentially generating a deterioration evaluating parameter representative of an integrated amount of moisture that is supplied to said hydrocarbon adsorbent by said exhaust gas, after said internal combustion engine has started to operate, and means for sequentially searching for a state in which the humidity represented by an output of said humidity sensor takes a minimum value, and detecting a changing timing at which said humidity changes from the state in which the humidity takes a minimum value to a monotonously increasing state, after said internal combustion engine has started to operate, wherein a deteriorated state of said hydrocarbon adsorbent is evaluated based on the value of said deterioration evaluating parameter at said changing timing (first invention).

According to the first aspect of the present invention, the apparatus has means for sequentially searching for a state in which the humidity represented by an output of said humidity sensor takes a minimum value, and detecting a changing timing at which said humidity changes from the state in which the humidity takes a minimum value to a monotonously increasing state, after said internal combustion engine has started to operate. Therefore, even if the humidity represented by the output of said humidity sensor varies immediately after the internal combustion engine has started to operate, due to variations in the humidity distribution in the exhaust passage of the internal combustion engine before said internal combustion engine starts to operate, it is possible to detect the changing timing, i.e., the timing at which the adsorption of moisture in the exhaust gas by the hydrocarbon adsorbent is actually saturated (hereinafter also referred to as "adsorption saturation timing"). The value of the deterioration evaluating parameter at the changing timing thus detected is representative of an integrated amount of moisture given to the hydrocarbon adsorbent until the adsorption of moisture by the hydrocarbon adsorbent is saturated after the internal combustion engine has started to operate. Stated otherwise, the value of the deterioration evaluating parameter at the changing timing (=the adsorption saturation timing) represents a maximum amount of moisture that can be adsorbed by the hydrocarbon adsorbent and hence an ability of the hydrocarbon adsorbent to adsorb hydrocarbons. Consequently, the deteriorated state of the hydrocarbon adsorbent can appropriately be evaluated based on the value of the deterioration evaluating parameter.

In the first aspect (the first invention) of the present invention, the means for sequentially generating a deterioration evaluating parameter sequentially integrates data representative of an amount of moisture contained in the exhaust gas produced by said internal combustion engine (more specifically, an amount of moisture contained in the exhaust gas produced by said internal combustion engine per a predetermined time) from the time when said internal combustion engine starts to operate, and generates an integrated value as the deterioration evaluating parameter (second invention). Thus, the deterioration evaluating parameter as an integrated amount of moisture supplied to the hydrocarbon adsorbent from the time when the internal combustion engine starts to operate can be obtained.

In the first aspect of the invention, the deterioration evaluating parameter may be a parameter representative of the integrated amount of moisture supplied to the hydrocarbon adsorbent by the exhaust gas from the time when said internal combustion engine starts to operate, or basically may be any data insofar as it is substantially proportional to the integrated amount of moisture. For example, since the amount of fuel supplied per a predetermined time to the internal combustion engine is substantially proportional to the amount of moisture in the exhaust gas produced by said internal combustion engine per the predetermined time, the amount of supplied fuel can be employed as the data of an amount of moisture contained in the exhaust gas. When the amount of fuel supplied to the internal combustion engine is sequentially integrated from the time when said internal combustion engine starts to operate, the integrated value is substantially proportional to the integrated amount of moisture, and can be employed as the deterioration evaluating parameter.

In the first aspect (the first invention or the second invention) of the present invention, it is preferable to compare a value of the deterioration evaluating parameter at said changing timing (the adsorption saturation timing) with a predetermined threshold which is established depending on the temperature of said hydrocarbon adsorbent at the time when said internal combustion engine starts to operate, for thereby evaluating the deteriorated state of said hydrocarbon adsorbent (third invention).

Specifically, the amount of moisture adsorbed by the hydrocarbon adsorbent from the time when said internal combustion engine starts to operate up to the changing timing (adsorption saturation timing) is affected by the temperature of the hydrocarbon adsorbent at the time when said internal combustion engine starts to operate. Basically, as the temperature of the hydrocarbon adsorbent is lower, the amount of moisture adsorbed by the hydrocarbon adsorbent up to the adsorption saturation timing is greater. Therefore, by comparing the value of the deterioration evaluating parameter at the adsorption saturation timing with the threshold which is established depending on the temperature of said hydrocarbon adsorbent at the time when said internal combustion engine starts to operate, the deteriorated state of said hydrocarbon adsorbent can accurately be evaluated.

The temperature of said hydrocarbon adsorbent may be grasped by recognizing the temperature of said hydrocarbon adsorbent itself with a sensor or an estimating process and the like. However, the temperature of a component which has substantially the same temperature as the hydrocarbon adsorbent (e.g., the temperature of the internal combustion engine) may be grasped, and may be employed as the temperature of said hydrocarbon adsorbent.

In the first aspect (the first through third inventions) of the present invention, the means for detecting a changing timing detects a time when the humidity represented by the output of said humidity sensor increases a predetermined quantity or more from said minimum value after the humidity has taken the minimum value, as said changing timing (fourth invention). With this arrangement, the changing timing (the adsorption saturation timing) can easily be detected.

However, in order to more reliably eliminate the effect of variations of the humidity represented by the output of the humidity sensor prior to the changing timing for detecting the changing timing, it is preferable to detect the changing timing as follows: In the first aspect (the first through third inventions) of the present invention, the means for detecting a changing timing stores the value of said deterioration evaluating parameter at a time, regarded as a temporary changing timing, when the humidity represented by the output of said humidity sensor increases a predetermined quantity or more from said minimum value after the humidity has taken the minimum value, and thereafter determines said temporary changing timing as a true changing timing when the humidity represented by the output of said humidity sensor increases to a predetermined upper limit value without taking a minimum value (fifth invention).

With the above arrangement, the time when the humidity represented by the output of the humidity sensor increases a predetermined quantity or more from said minimum value that has finally been taken is determined as a true changing timing (the adsorption saturation timing). Therefore, it is possible to reliably grasp the true changing timing at which the humidity represented by the output of the humidity sensor changes to a monotonously increasing state. Conversely, even if the humidity represented by the output of the humidity sensor temporarily varies the predetermined quantity or more before a true changing timing occurs, the time at which the humidity varies is prevented from being detected in error as a changing timing.

In the fifth invention, the predetermined upper limit value may be set to a value close to a steady value that is finally reached (converged to) by the humidity by an increase in the humidity represented by the humidity sensor, for example.

In the fifth invention, it is preferable to evaluate the deteriorated state of said hydrocarbon adsorbent based on the value of the deterioration evaluating parameter at said true changing timing only if the difference between a value which is the sum of said minimum value immediately prior to said temporary changing timing and said predetermined quantity, and said predetermined upper limit value is equal to or greater than a predetermined lower limit value, when said temporary changing timing is determined as said true changing timing (sixth invention).

Specifically, if the difference between the value which is the sum of said minimum value immediately prior to said temporary changing timing and said predetermined quantity, and said predetermined upper limit value is small, then after the adsorption of moisture by the hydrocarbon adsorbent is saturated, there is a possibility that humidity represented by the output of the humidity sensor may have temporarily been lowered by disturbances or the like. In this case, the timing determined as the true changing timing as described above may not be appropriate as the adsorption saturation timing at which the hydrocarbon adsorbent is actually saturated. According to the present invention (sixth invention), the deteriorated state of said hydrocarbon adsorbent is evaluated based on the value of the deterioration evaluating parameter at said true changing timing only if the difference between the value which is the sum of said minimum value immediately prior to said temporary changing timing and said predetermined quantity, and said predetermined upper limit value is equal to or greater than the predetermined lower limit value. With this arrangement, the reliability of the evaluation of the deteriorated state of the hydrocarbon adsorbent can be maintained.

A second aspect of the present invention will be described below. A supplemental explanation of the second aspect of the present invention will be given below. While the internal combustion engine is being shut off, the hydrocarbon adsorbent adsorbs ambient moisture to some degree. Therefore, when the internal combustion engine starts to operate next time, the humidity in the vicinity of the hydrocarbon adsorbent including a region upstream thereof is relatively low. When the internal combustion engine starts to operate, there is a slight delay until the exhaust gas containing moisture produced by the internal combustion engine reaches a region near the inlet of the hydrocarbon adsorbent. Therefore, the humidity upstream of the hydrocarbon adsorbent is low for a relatively short period of time immediately after the internal combustion engine starts to operate. Subsequently, when the exhaust gas which is highly humid reaches the region near the inlet of the hydrocarbon adsorbent, the humidity upstream of the hydrocarbon adsorbent changes from the low humidity level to a state in which it monotonously increases to a higher humidity. The changing timing at which the humidity upstream of the hydrocarbon adsorbent changes from the low humidity level to the monotonously increasing state may vary due to the structure of the exhaust system of the internal combustion engine and the absorption of moisture by a catalytic converter disposed upstream of the hydrocarbon adsorbent. In this case, the timing for the hydrocarbon adsorbent to start essentially adsorbing moisture in the exhaust gas is liable to vary. For more appropriately evaluating the deteriorated state of the hydrocarbon adsorbent (the ability thereof to adsorb HCs and moisture), it is preferable to detect the changing timing at which the humidity upstream of the hydrocarbon adsorbent changes from a low humidity level to a state in which it monotonously increases to a higher humidity, with a humidity sensor disposed upstream of the hydrocarbon adsorbent, and acquire data representative of an integrated amount of moisture supplied to the hydrocarbon adsorbent from a changing timing of the output of the upstream humidity sensor to a changing timing of the output of the downstream humidity sensor, as the deterioration evaluating parameter.

In detecting the changing timing of the humidity detected by the upstream humidity sensor, the humidity prior to the changing timing of the upstream humidity may vary due to variations in the humidity distribution in the exhaust passage before said internal combustion engine starts to operate. Therefore, it is preferable to detect the changing timing of the humidity detected by the upstream humidity sensor according to a process which is the same as the process of detecting the changing timing of the humidity detected by the downstream humidity sensor.

In order to achieve the above object, there is provided in accordance with the second aspect of the present invention an apparatus for evaluating a deteriorated state of an exhaust gas purifier disposed in an exhaust passage of an internal combustion engine and having a hydrocarbon adsorbent for adsorbing hydrocarbons in an exhaust gas flowing through the exhaust passage, comprising a downstream humidity sensor and an upstream humidity sensor disposed respectively downstream and upstream of said hydrocarbon adsorbent for outputting signals depending on the humidity of said exhaust gas, means for sequentially searching for a state in which the humidity represented by an output of said upstream humidity sensor takes a minimum value, and detecting a timing at which said humidity changes from the state in which the humidity takes a minimum value to a monotonously increasing state as an upstream changing timing, after said internal combustion engine has started to operate, means for sequentially searching for a state in which the humidity represented by an output of said downstream humidity sensor takes a minimum value, and detecting a timing at which said humidity changes from the state in which the humidity takes a minimum value to a monotonously increasing state as a downstream changing timing, after said internal combustion engine has started to operate, and means for generating a deterioration evaluating parameter representative of an integrated amount of moisture that is supplied to said hydrocarbon adsorbent by the exhaust gas from said internal combustion engine from said upstream changing timing to said downstream changing timing, wherein a deteriorated state of said hydrocarbon adsorbent is evaluated based on the value of the deterioration evaluating parameter (seventh invention).

According to the second aspect of the present invention, with respect to the humidity downstream of the hydrocarbon adsorbent, as with the first invention, even if the humidity represented by the output of said downstream humidity sensor varies immediately after the internal combustion engine has started to operate, due to variations in the humidity distribution in the exhaust passage before said internal combustion engine starts to operate, it is possible to detect the downstream changing timing, i.e., the adsorption saturation timing at which the adsorption of moisture in the exhaust gas by the hydrocarbon adsorbent is actually saturated. With respect to the humidity upstream of the hydrocarbon adsorbent, the apparatus has means for sequentially searching for a state in which the humidity represented by an output of said upstream humidity sensor takes a minimum value, and detecting an upstream changing timing at which said humidity changes from the minimum value to a monotonously increasing state, after said internal combustion engine has started to operate. Therefore, as with the situation downstream of the hydrocarbon adsorbent, even if the humidity represented by the output of said upstream humidity sensor varies immediately after the internal combustion engine has started to operate, due to variations in the humidity distribution in the exhaust passage before said internal combustion engine starts to operate, it is possible to detect the upstream changing timing, i.e., timing at which the adsorption of moisture in the exhaust gas by the hydrocarbon adsorbent actually starts (hereinafter also referred to as "adsorption start timing").

In the second aspect of the present invention, a deterioration evaluating parameter is generated which is representative of an integrated amount of moisture that is supplied to said hydrocarbon adsorbent by the exhaust gas from said internal combustion engine from said upstream changing timing thus detected to said downstream changing timing. Thus, the value of the deterioration evaluating parameter represents an integrated amount of moisture supplied to the hydrocarbon adsorbent from the time when the hydrocarbon adsorbent substantially starts to adsorb moisture until saturation, after the internal combustion engine starts to operate. Therefore, the value of the deterioration evaluating parameter in the second aspect of the present invention is more accurate as representing a maximum amount of moisture that can be adsorbed by the hydrocarbon adsorbent, and hence the ability of the hydrocarbon adsorbent to adsorb hydrocarbons. Consequently, the deteriorated state of the hydrocarbon adsorbent can more appropriately be evaluated by evaluating the deteriorated state based on the value of the deterioration evaluating parameter.

In the second aspect (the seventh invention) of the present invention, the apparatus may have preferred forms similar to those of the second through sixth inventions according to the first aspect of the invention. Specifically, the means for sequentially generating a deterioration evaluating parameter sequentially integrates data representative of an amount of moisture contained in the exhaust gas produced by said internal combustion engine (more specifically, an amount of moisture containing in the exhaust gas produced by the internal combustion engine per a predetermined time) from the time when said internal combustion engine starts to operate, and determines the deviation between an integrated value at the changing timing relative to said upstream humidity sensor and an integrated value at the changing timing relative to said downstream humidity sensor, as the deterioration evaluating parameter (eighth invention). In this manner, it is possible to obtain a deterioration evaluating parameter as representing an integrated amount of moisture supplied to the hydrocarbon adsorbent from the upstream changing timing to the downstream changing timing.

The deterioration evaluating parameter in the second aspect of the invention may be a parameter representative of the integrated amount of moisture supplied to the hydrocarbon adsorbent by the exhaust gas from the upstream changing timing to the downstream changing timing, or basically may be any data insofar as it is substantially proportional to the integrated amount of moisture. For example, as described above with respect to the first aspect, since the amount of fuel supplied per a predetermined time to the internal combustion engine can be used as data of an amount of moisture in the exhaust gas, when the amount of fuel supplied to the internal combustion engine is sequentially integrated from the time when said internal combustion engine starts to operate, the difference between the integrated value of the amount of fuel supplied at the upstream changing timing and the integrated value of the amount of fuel supplied at the downstream changing timing can be employed as the deterioration evaluating parameter.

As described above with respect to the first aspect, the lower the temperature of the hydrocarbon adsorbent, the greater the amount of moisture which is adsorbed by the hydrocarbon adsorbent up to the downstream changing timing (the adsorption saturation timing). In the second aspect (the seventh invention or the eighth invention) of the present invention, it is preferable to evaluate the deteriorated state of said hydrocarbon adsorbent by comparing the value of said deterioration evaluating parameter with a predetermined threshold that is established depending on the temperature of said hydrocarbon adsorbent at the time when said internal combustion engine starts to operate (ninth invention). In this manner, the deteriorated state of said hydrocarbon adsorbent can accurately be evaluated. The temperature of the hydrocarbon adsorbent may be grasped in the manner described above with respect to the first aspect.

In the second aspect (the seventh through ninth inventions) of the present invention, the means for detecting a changing timing, or more specifically, said means for detecting an upstream changing timing, detects a time when the humidity represented by the output of said upstream humidity sensor increases a first predetermined quantity or more from said minimum value after the humidity has taken the minimum value, as said upstream changing timing, and said means for detecting a downstream changing timing detects a time when the humidity represented by the output of said downstream humidity sensor increases a second predetermined quantity or more from said minimum value after the humidity has taken the minimum value, as said downstream changing timing (tenth invention). In this manner, the upstream changing timing (the adsorption start timing) and the downstream changing timing (the adsorption saturation timing) can easily be detected.

However, in order to more reliably eliminate the effect of variations of the humidity represented by the output of each of the humidity sensors prior to the changing timing for detecting the upstream and downstream changing timings, it is preferable to detect the upstream and downstream changing timings as follows: The means for detecting an upstream changing timing detects a time when the humidity represented by the output of said upstream humidity sensor increases a first predetermined quantity or more from said minimum value after the humidity has taken the minimum value, as a temporary upstream changing timing, and thereafter determines said temporary upstream changing timing as a true upstream changing timing when the humidity represented by the output of said upstream humidity sensor increases to a predetermined first upper limit value without taking a minimum value, and said means for detecting a downstream changing timing detects a time when the humidity represented by the output of said downstream humidity sensor increases a second predetermined quantity or more from said minimum value after the humidity has taken the minimum value, as a temporary downstream changing timing, and thereafter determines said temporary downstream changing timing as a true downstream changing timing when the humidity represented by the output of said downstream humidity sensor increases to a predetermined second upper limit value without taking a minimum value (eleventh invention).

With the above arrangement, the time when the humidity represented by the output of the upstream humidity sensor increases the first predetermined quantity or more from the minimum value that it has finally taken is determined as a true upstream changing timing (the adsorption start timing). Similarly, the time when the humidity represented by the output of the downstream humidity sensor increases the second predetermined quantity or more from the minimum value that it has finally taken is determined as a true downstream changing timing (the adsorption saturation timing). Therefore, a true changing timing at which the humidity represented by the output of each of the humidity sensors changes to a monotonously increasing state can reliably be grasped. Conversely, even if the humidity represented by the output of each of the humidity sensors temporarily varies the predetermined quantity (the first or second predetermined quantity) or more before a true changing timing occurs, the time at which the humidity varies is prevented from being detected in error as a changing timing.

In the tenth or eleventh invention, the first predetermined quantity and the second predetermined quantity may basically be of the same value if the upstream humidity sensor and the downstream humidity sensor are sensors of the same type (sensors of the same characteristics). However, the first predetermined quantity and the second predetermined quantity may be of respective values in view of rates of change of the upstream humidity and the downstream humidity. In the eleventh invention, the first upper limit value may be set to a value close to a steady value that is finally reached (converged to) by the humidity due to an increase in the humidity represented by the upstream humidity sensor, for example. This also holds true for the second upper limit value relative to the downstream humidity sensor. If both the humidity sensors are sensors of the same type (sensors of the same characteristics), then the first upper limit value and the second upper limit value may be the same as each other.

In the eleventh invention, it is preferable to evaluate the deteriorated state of said hydrocarbon adsorbent based on the value of the deterioration evaluating parameter representing said integrated amount of moisture from said true downstream changing timing to said upstream changing timing only if the difference between a value which is the sum of the minimum value of the humidity relative to said upstream humidity sensor immediately prior to said temporary upstream changing timing and said first predetermined quantity, and said predetermined first upper limit value is equal to or greater than a predetermined first lower limit value, and if the difference between a value which is the sum of the minimum value of the humidity relative to said downstream humidity sensor immediately prior to said temporary downstream changing timing and said second predetermined quantity, and said predetermined second upper limit value is equal to or greater than a predetermined second lower limit value, when said temporary upstream changing timing is determined as said true upstream changing timing and said temporary downstream changing timing is determined as said true downstream changing timing (twelfth invention).

Specifically, with respect to the humidity upstream of the hydrocarbon adsorbent, if the difference between the value which is the sum of the minimum value of the humidity relative to said upstream humidity sensor immediately prior to said temporary upstream changing timing and said first predetermined quantity, and said predetermined first upper limit value is small, then after the exhaust gas containing much moisture reaches a region near the inlet of the hydrocarbon adsorbent and the hydrocarbon adsorbent starts to essentially adsorb the moisture, the upstream humidity may have possibly been temporarily lowered due to disturbances or the like. In such a case, the timing determined as the true upstream changing timing is not appropriate as an actual adsorption start timing. With respect to the humidity downstream of the hydrocarbon adsorbent, as with the sixth invention according to the first aspect, if the difference between the value which is the sum of the minimum value of the humidity relative to said downstream humidity sensor immediately prior to said temporary downstream changing timing and said second predetermined quantity, and said predetermined second upper limit value is small, then the timing determined as the true downstream changing timing is not appropriate as an actual adsorption saturation timing.

According to the present invention (the twelfth invention), therefore, the deteriorated state of said hydrocarbon adsorbent is evaluated based on the value of said deterioration evaluating parameter representing said integrated amount of moisture from said true downstream changing timing to said true upstream changing timing only if the difference between the value which is the sum of the minimum value of the humidity relative to said upstream humidity sensor immediately prior to said temporary upstream changing timing and said first predetermined quantity, and said predetermined first upper limit value is equal to or greater than the predetermined first lower limit value, and if the difference between the value which is the sum of the minimum value of the humidity relative to said downstream humidity sensor immediately prior to said temporary downstream changing timing and said second predetermined quantity, and said predetermined second upper limit value is equal to or greater than the predetermined second lower limit value. In this manner, the reliability of the evaluation of the deteriorated state of said hydrocarbon adsorbent is maintained.

BEST MODE FOR CARRYING OUT THE INVENTION

Figure 1:
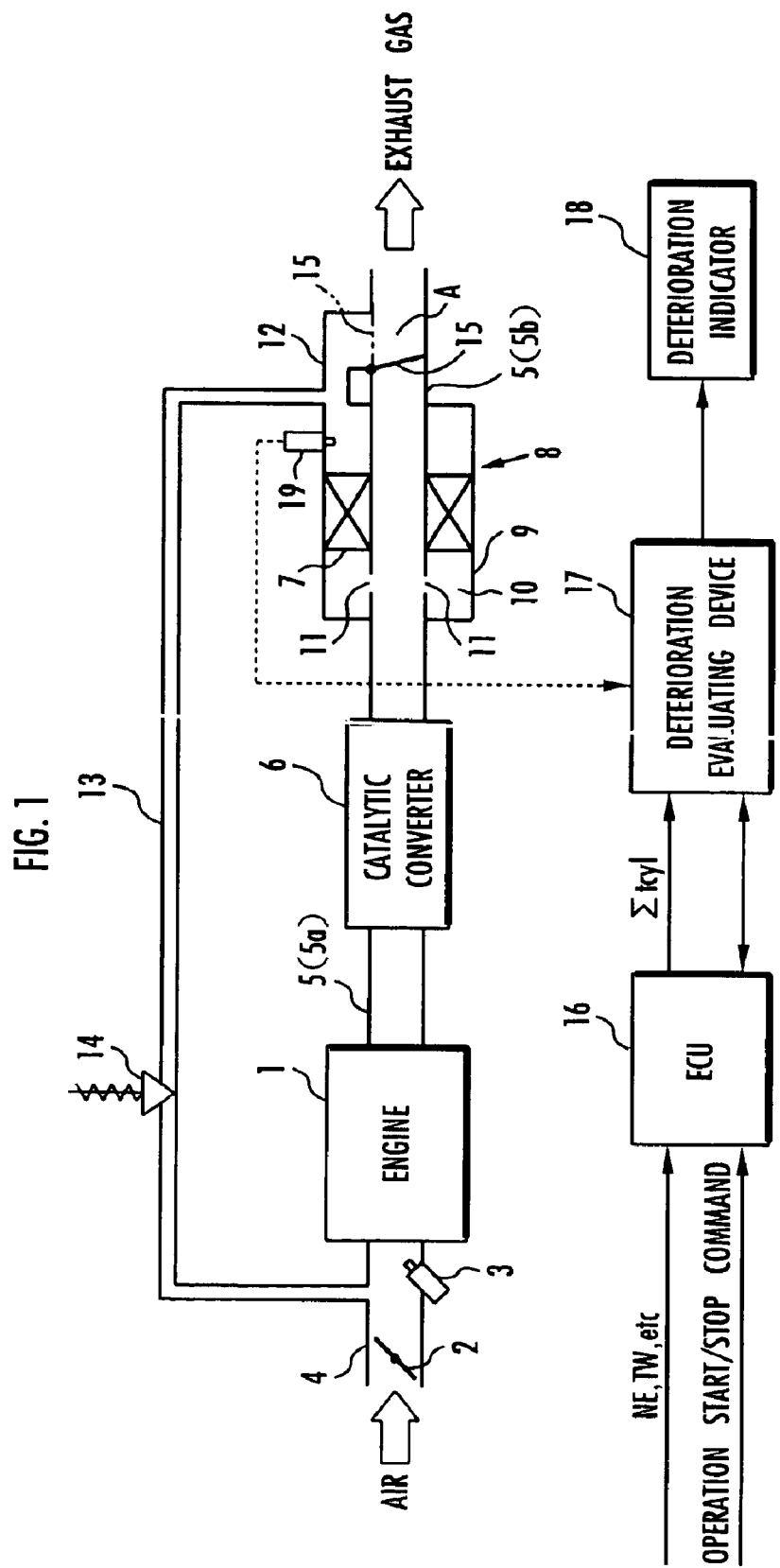
FIG. 1 is a block diagram of an overall system arrangement of an apparatus according to first and second embodiments of the present invention.

A first embodiment of the present invention will be described below with reference to FIGS. 1 through 7. The first embodiment of the present invention corresponds to a first aspect of the present invention. FIG. 1 is a block diagram of an overall system arrangement of the apparatus according to the present embodiment. In FIG. 1, an engine (an internal combustion engine) 1 mounted on an automobile or a hybrid vehicle, for example, draws a mixture of fuel and air from an intake pipe 4 having a throttle valve 2 and a fuel injector 3, and combusts the mixture and generates an exhaust gas, which is discharged into an exhaust pipe (exhaust passage) 5. A catalytic converter 6 and an exhaust gas purifier 8 which incorporates a hydrocarbon adsorbent 7 (hereinafter referred to as HC adsorbent 7) are successively arranged downstream and mounted on the exhaust pipe 5 for purifying the exhaust gas emitted from the engine 1. A portion of the exhaust pipe 5 which extends upstream of the catalytic converter 6 and a portion of the exhaust pipe 5 which extends downstream of the catalytic converter 6 are referred to as an upstream exhaust pipe 5a and a downstream exhaust pipe 5b, respectively. The downstream exhaust pipe 5b has a downstream end that is open into the atmosphere.

The catalytic converter 6 incorporates a three-way catalyst (not shown) therein. The catalytic converter 6 purifies, by way of oxidizing and reducing reactions, gas components including nitrogen oxide (NOx), hydrocarbons (HC), carbon monoxide (CO), etc. contained in the exhaust gas emitted from the engine 1 and supplied from the upsream exhaust pipe 5a into the catalytic converter 6.

The exhaust gas purifier 8 has a substantially cylindrical housing 9 mounted on the downstream exhaust pipe 5b in covering relation to the outer circumferential surface thereof. The downstream exhaust pipe 5b extends centrally through the housing 9. A tubular space 10 defined between the inner circumferential surface of the housing 9 and the outer circumferential surface of the downstream exhaust pipe 5b serves as a bypass exhaust passage 10 for branching the exhaust gas from the downstream exhaust pipe 5b. The tubular-shaped HC adsorbent 12 is mounted in the bypass exhaust passage 10. The HC adsorbent 12 is made of a zeolite-based material and serves to adsorb HC contained in the exhaust gas which is emitted from the engine 1 in an initial phase of operation of the internal combustion engine 1, as with conventional HC adsorbents.

The bypass exhaust passage 10 of the exhaust gas purifier 8 which has the HC adsorbent 7 communicates with the interior of the downstream exhaust pipe 5b through a plurality of vent holes 11 that are defined in the downstream exhaust pipe 5b within the housing 9 upstream of the HC adsorbent 7. The bypass exhaust passage 10 also communicates with and is joined to the downstream exhaust pipe 5b through a joint pipe 12 that extends from the housing 9 downstream of the HC adsorbent 7. Furthermore, the bypass exhaust passage 10 is connected to the intake pipe 4 downstream of the throttle valve 2 by an EGR (Exhaust Gas Recirculation) passage 13 that extends from the housing 9 downstream of the HC adsorbent 7.

The EGR passage 13 serves to return the exhaust gas to the intake side of the engine 1 under given conditions during operation of the engine 1 in order to combust an unburned gas in the exhaust gas. An on/off valve (solenoid-operated valve) 14 is mounted in the EGR passage 13 for selectively opening and closing the EGR passage 13.

The downstream exhaust pipe 5b and the joint pipe 12 are joined to each other at a junction A where there is disposed a directional control valve 15 for venting one, at a time, of the portion of the downstream exhaust pipe 5b which extends upstream of the junction A and the bypass exhaust passage 10 to the atmosphere. The directional control valve 15 can be angularly moved between a solid-line position and an imaginary-line position in FIG. 1 by an actuator (not shown). When the directional control valve 15 is actuated into the solid-line position, it shields the portion of the downstream exhaust pipe 5b which extends upstream of the junction A from the atmosphere at the junction A, and simultaneously vents the bypass exhaust passage 10 to the atmosphere. Conversely, when the directional control valve 15 is actuated into the imaginary-line position, it vents the downstream exhaust pipe 5b to the atmosphere and shields the bypass exhaust passage 10 to the atmosphere.

Figure 2:
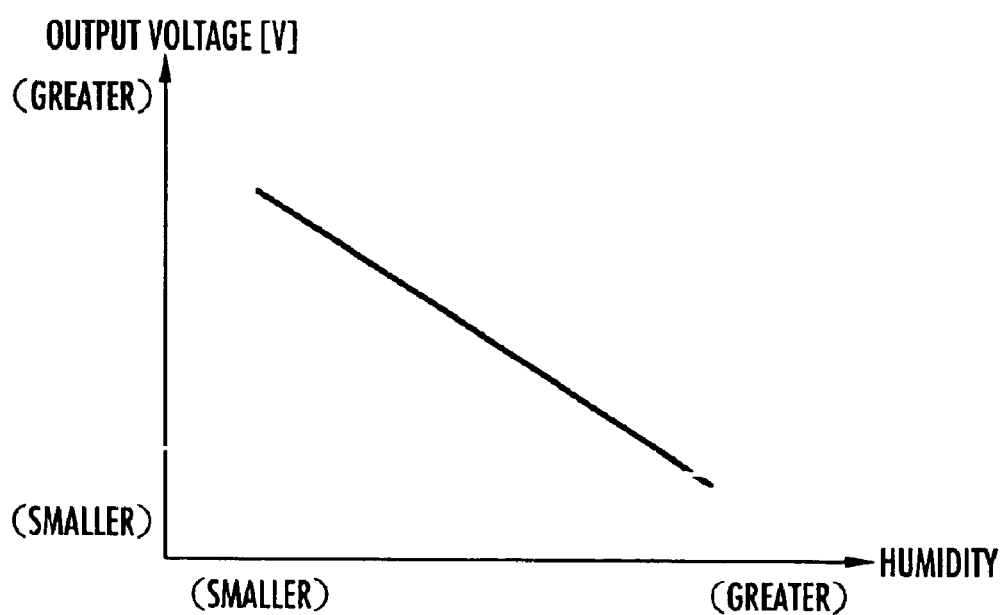
FIG. 2 is a diagram showing output characteristics of a humidity sensor used in the apparatus shown in FIG. 1.

The apparatus also has, in addition to the above mechanical structures, the following components for controlling operation of the engine 1 and evaluating a deteriorated state of the HC adsorbent 7. Specifically, the apparatus has a controller 16 (hereinafter referred to as "ECU 16") for controlling operation of the engine 1 (including operation of the on/off valve 14 in the EGR passage 13 and the directional control valve 15), a deterioration evaluating device 17 for executing a processing sequence to evaluate a deteriorated state of the HC adsorbent 7, a deterioration indicator 18 for indicating the deteriorated state as evaluated, and a humidity sensor 19 mounted on the housing 9 downstream of the HC adsorbent 7 for detecting the humidity of the exhaust gas that has passed through the HC adsorbent 7. The ECU 16 and the deterioration evaluating device 17 are implemented by a microcomputer or the like. The deterioration indicator 18 comprises a lamp, a buzzer, or a display unit for displaying characters, a graphic image, etc. The humidity sensor 19 produces an output voltage depending on the humidity (relative humidity) of the exhaust gas, as shown in FIG. 2. The output voltage of the humidity sensor 19 decreases substantially linearly as the humidity increases.

As shown in FIG. 1, the ECU 16 is supplied with detected data of the rotational speed NE of the engine 1, the engine temperature TW thereof (specifically, the temperature of the coolant of the engine 1), etc. from non-illustrated sensors, and also with an operation start command signal and an operation stop command signal for the engine 1 from a non-illustrated operation switch. The ECU 16 then controls operation of the engine 1 based on the detected data and the command signals that are supplied thereto, according to a predetermined control program. Specifically, the ECU 16 controls the opening of the throttle valve 2 with an actuator (not shown), controls the amount of fuel injected by the fuel injector 3, controls an igniter (not shown), controls the starting of the engine 1 with a starter motor (not shown), controls the on/off valve 14 mounted in the EGR passage 13, and controls operation of the directional control valve 15.

The ECU 16 has a function as a means for sequentially determining a deterioration evaluating parameter according to the present invention. The ECU 16 executes a process of sequentially determining an integrated value that is produced by sequentially integrating (accumulatively adding), from the start of operation of the engine 1, a command value for the amount of fuel to be injected by the fuel injector 3, which is sequentially generated by the ECU 16 in synchronism with a so-called TDC signal, i.e., a timing synchronous with the rotational speed NE of the engine 1, for controlling the amount of fuel to be supplied to the engine 1, as a deterioration evaluating parameter representative of an integrated amount of moisture that has been given by the exhaust gas to the HC adsorbent 7 of the exhaust gas purifier 8 from the start of operation of the engine 1. Specifically, there is an essentially constant correlation between the amount of fuel supplied to the engine 1 and the amount of moisture contained in the exhaust gas that is emitted from the engine 1 when the mixture of the supplied fuel and air is combusted. The integrated amount of moisture that is carried by the exhaust gas to the HC adsorbent 7 after the engine 1 has started to operate depends on the integrated value of the command value for the amount of fuel to be injected. According to the present embodiment, therefore, the integrated value of the command value for the amount of fuel to be injected (hereinafter referred to as "integrated fuel injection quantity $\Sigma tcyl$") is regarded as a deterioration evaluating parameter and calculated by the ECU 16. The deterioration evaluating parameter representing the integrated amount of moisture is not limited to the integrated value of the command value for the amount of fuel to be injected, but may be an integrated value of a detected or estimated value of the amount of intake air supplied to the engine 1. Furthermore while then engine 1 is idling, a time that has elapsed from the time when the engine 1 has started to operate may be used as a deterioration evaluating parameter representing the integrated amount of moisture.

The deterioration evaluating device 17 is supplied with the output voltage (a signal indicative of a detected humidity) from the humidity sensor 19, data of the integrated fuel injection quantity Σtcyl from the ECU 16, and detected data of the engine temperature TW of the engine 1 from the ECU 169. The deterioration evaluating device 17 evaluates a deteriorated state of the HC adsorbent 7 of the exhaust gas purifier 8 based on the supplied data according to a predetermined program, as described later on. The deterioration evaluating device 17 evaluates a deteriorated state of the HC adsorbent 7 as either a state where it has been deteriorated to the extent that the exhaust gas purifier 8 needs to be replaced (such a deteriorated state will hereinafter be referred to as "deterioration-in-progress state") or a state where it has not been deteriorated to the deterioration-in-progress state (such a state will hereinafter be referred to as "non-deteriorated stated"). When the deterioration evaluating device 17 judges that the deteriorated state of the HC adsorbent 7 is the deterioration-in-progress state, the deterioration evaluating device 17 controls the deterioration indicator 18 to indicate the deteriorated state as thus evaluated. The deterioration evaluating device 17 is capable of exchanging various data with the ECU 16, and is capable of giving the ECU 16 data related to a process of evaluating a deteriorated state of the HC adsorbent 7, e.g., data indicative of whether the adsorption of moisture by the HC adsorbent 7 has been saturated or not.

Operation of the apparatus according to the present embodiment, particularly for evaluating a deteriorated state of the HC adsorbent 7, will be described in detail below.

When the operation switch (not shown) is turned on to start operation of the engine 1, the ECU 16 and the deterioration evaluating device 17 are activated. The ECU 16 operates the directional control valve 15 to move to the imaginary-line position in FIG. 1 with the non-illustrated motor. The downstream exhaust pipe 5b is shielded at the junction A, and the bypass exhaust passage 10 of the exhaust gas purifier 8 is vented to the atmosphere. The ECU 16 then starts the engine 1 with the starter motor (not shown) to rotate the crankshaft (not shown) of the engine 1. The ECU 16 controls the fuel injector 3 to supply the fuel to the engine 1, and controls the igniter (not shown) to start operating the engine 1. From the time when the fuel injector 3 starts to supply the fuel to the engine 1, the ECU 16 sequentially calculates an integrated fuel injection quantity Σtcyl.

When the engine 1 starts operating, it emits an exhaust gas that is discharged through the upstream exhaust pipe 5a, the catalytic converter 6, the upstream portion of the downstream exhaust pipe 5b (extending from the catalytic converter 6 to the vent holes 11), the bypass exhaust passage 10, the HC adsorbent 7, the joint pipe 12, and the downstream portion of the downstream exhaust pipe 5b (extending downstream of the directional control valve 15) into the atmosphere. At this time, while the exhaust gas is passing through the HC adsorbent 7 in the bypass exhaust passage 10, hydrocarbons (HCs) in the exhaust gas are adsorbed by the HC adsorbent 7. Therefore, even while the catalytic converter 6 is not sufficiently activated as when the engine 1 starts to operate at a low temperature, the HCs are prevented from being discharged into the atmosphere. At the same time, the HC adsorbent 7 adsorbs moisture in the exhaust gas as well as the HCs in the exhaust gas.

Figure 3:
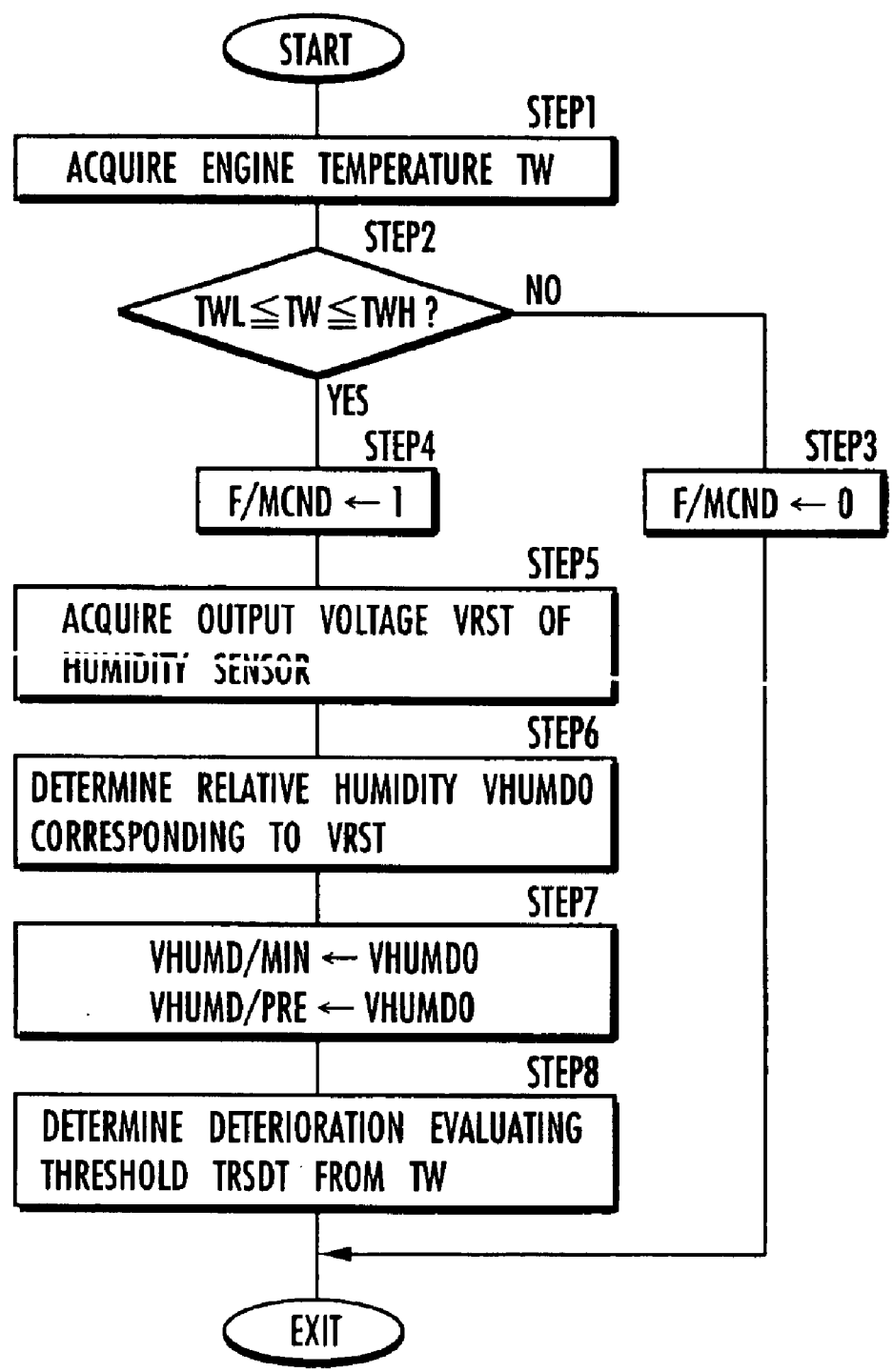
FIG. 3 is a flowchart of a processing sequence of a deterioration evaluation processing apparatus according to the first embodiment of the present invention.

After the deterioration evaluating device 17 is activated, it performs a processing sequence shown in FIG. 3. The process shown in FIG. 3 is performed only when the engine 1 starts operating.

First, the deterioration evaluating device 17 acquires from the ECU 16 detected data representative of the engine temperature TW (hereinafter referred to as "initial engine temperature TW") of the engine 1 as data representative of the temperature of the HC adsorbent 7 at the start of operation of the engine 1 in STEP1. If the apparatus has a temperature sensor for detecting the temperature of the HC adsorbent 7 or a nearby region, then the above data may be detected from the temperature sensor.

Thereafter, the deterioration evaluating device 17 determines whether the initial engine temperature TW is in a predetermined range (TWL≦TW≦THW) or not in STEP2. If the initial engine temperature TW is not in the above predetermined range, then the deterioration evaluating device 17 sets a flag F/MCND to "0" in STEP3 in order to inhibit an evaluation (described later on) of the deteriorated state of the HC adsorbent 7, and then puts the processing sequence shown in FIG. 3 to an end. This is because the deteriorated state of the HC adsorbent 7 cannot adequately be evaluated if the temperature of the HC adsorbent 7 is excessively low (e.g., 0° C. or lower) or if the temperature of the HC adsorbent 7 is excessively high (e.g., 50° C. or higher).

If the initial engine temperature TW is in the predetermined range in STEP2, then the deterioration evaluating device 17 determines whether sets the flag F/MCND to "1" in STEP4 in order to carry out a process of evaluating the deteriorated state of the HG adsorbent 7. Thereafter, the deterioration evaluating device 17 acquires present data of the output voltage VRST of the humidity sensor 19 in STEP5, and determines a relative humidity VHUMD0 corresponding to the output voltage VRST as an initial relative humidity at the start of operation of the engine 1 in STEP6. The initial relative humidity VHUMD0 is determined from the value of the output voltage VRST acquired in STEP5 based on a data table or a formula representative of the output characteristics of the humidity sensor 19 shown in FIG. 2.

The deterioration evaluating device 17 then stores the value of the initial relative humidity VHUMD0 as the value of a parameter VHUMD/MIN (hereinafter referred to as "minimum humidity parameter VHUMD/MIN") representative of the latest value of a minimum value of a humidity (relative humidity) in the location of the humidity sensor 19 downstream of the HC adsorbent 7, and the value of a parameter VHUMD/PRE (hereinafter referred to as "preceding relative humidity parameter VHUMD/PRE") representative of a preceding value of the relative humidity (preceding value for each cycle time of the processing sequence of the deterioration evaluating device 17) in STEP7. That is, the deterioration evaluating device 17 initializes the values of these parameters VHUMD/MIN, VHUMD/PRE with the value of the initial relative humidity VHUMD0 as the humidity (relative humidity) downstream of the HC adsorbent 7 at the time the engine 1 starts to operate.

Figure 4:
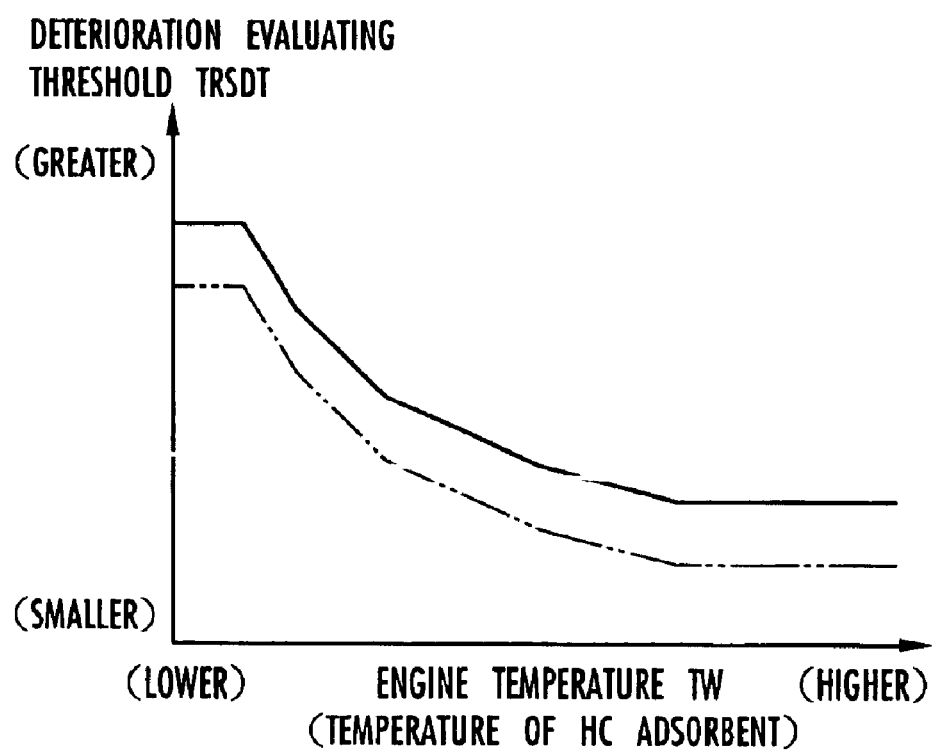
FIG. 4 is a diagram showing a data table used in the flowchart shown in FIG. 3.

Then, the deterioration evaluating device 17 determines a deterioration evaluating threshold TRSDT with which to determine whether the HG adsorbent 7 is in the deterioration-in-progress state or the non-deteriorated state from the detected data of the initial engine temperature TW acquired in STEP1 according to a predetermined data table as indicated by the solid-line curve in FIG. 4 in STEP8. Thereafter, the processing sequence shown in FIG. 3 is put to an end.

The lower the initial temperature of the HC adsorbent 7, the greater the maximum amount of moisture and hence the maximum amount of HCs that can be adsorbed by the HC adsorbent 7. Therefore, according to the data table as indicated by the solid-line curve in FIG. 4, the deterioration evaluating threshold TRSDT is basically determined such that it has a greater value as engine temperature TW at the time the engine 1 starts to operate is lower. The deterioration evaluating threshold TRSDT corresponds to the maximum amount of moisture that can be adsorbed by the HC adsorbent 7 (which corresponds to the maximum amount of HCs that can be adsorbed) when the HC adsorbent 7 changes from the non-deteriorated state to the deterioration-in-progress state. The adsorption deterioration evaluation threshold TRSDT is determined by way of experimentation or the like. In the present embodiment, an integrated fuel injection quantity $\Sigma$ is used instead of an actual amount of moisture. A data table as indicated by the imaginary-line curve in FIG. 4 will be referred to later in the description of a third embodiment of the present invention.

Figure 5:
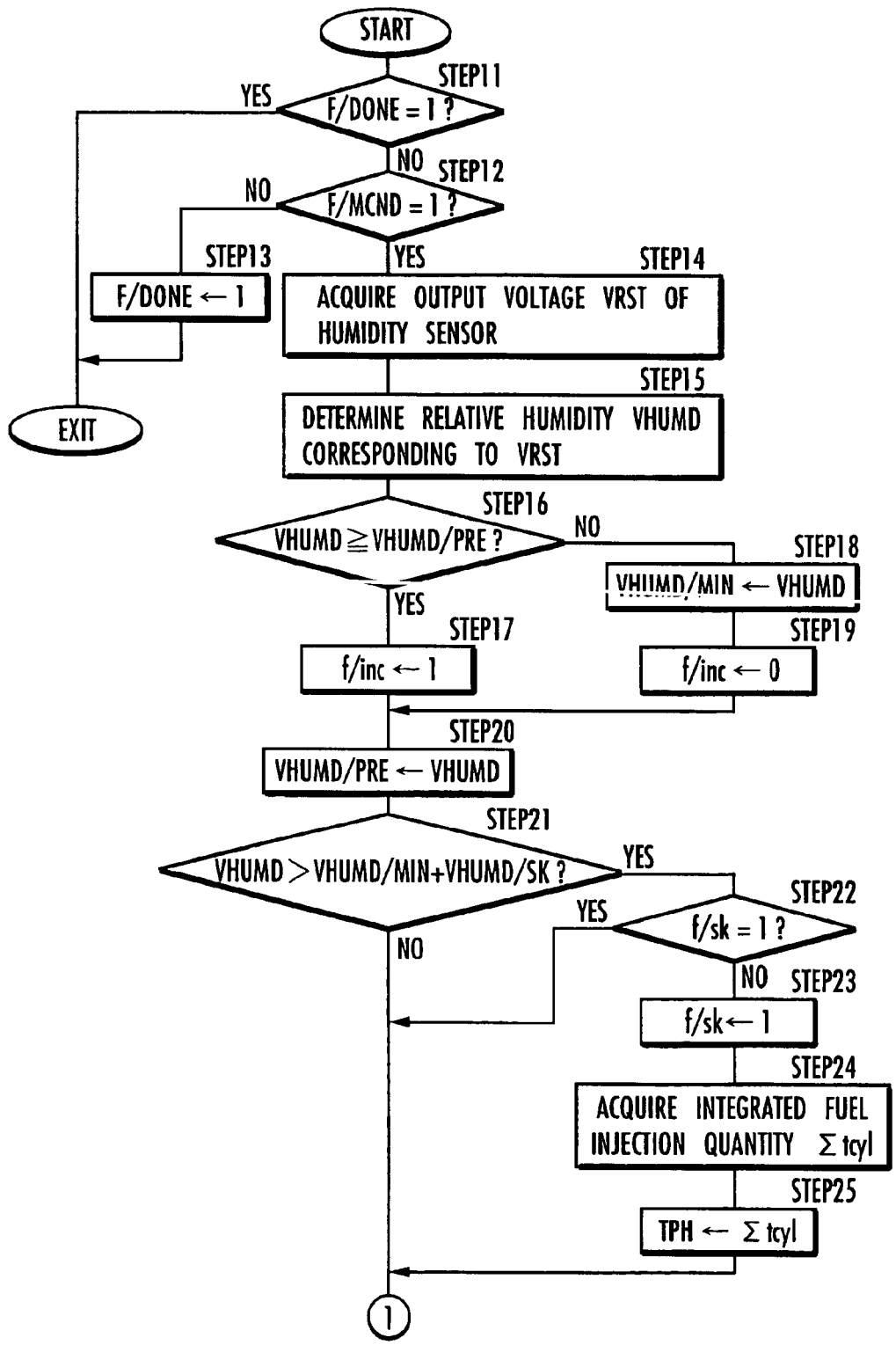
FIGS. 5 and 6 are flowcharts of a processing sequence of the deterioration evaluation processing apparatus according to the first embodiment of the present invention.
Figure 6:
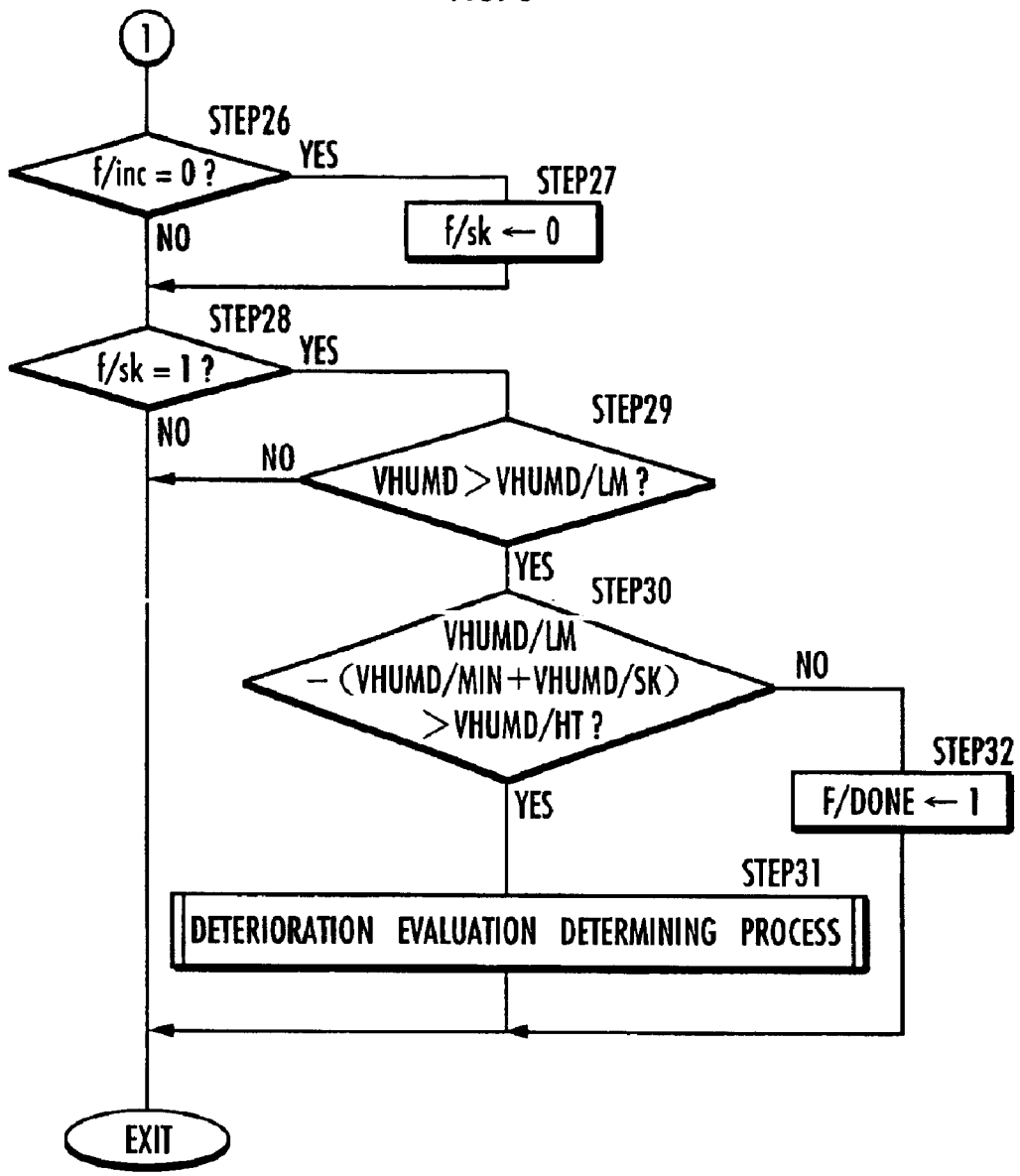

After having performed the processing sequence shown in FIG. 3 at the time the engine 1 starts to operate, the deterioration evaluating device 17 performs a processing sequence shown in FIGS. 5 and 6 in a predetermined cycle time.

The deterioration evaluating device 17 determines the value of a flag F/DONE in STEP11. When the value of the flag F/DONE is "1", then it indicates that the evaluation of the deteriorated state of the HC adsorbent 7 is completed, and when the value of the flag F/DONE is "0", then it indicates that the evaluation of the HC adsorbent 7 is not completed. Each time the engine 1 starts to operate, the value of the flag F/DONE is initialized to "0". If F/DONE=1, then since the evaluation of the deteriorated state of the HC adsorbent 7 is completed, the processing sequence shown in FIGS. 5 and 6 is put to an end.

If F/DONE=0, then the deterioration evaluating device 17 determines the value of a flag F/MCND in STEP12. If F/MCND=0, then it means that the initial temperature of the HC adsorbent is in a temperature state not suitable for evaluating the deteriorated state of the HC adsorbent 7, and the deterioration evaluating device 17 sets the flag F/DONE to "1" in STEP13 in order to cancel the evaluation of the deteriorated state of the HC adsorbent 7 in next and subsequent cycle times. Then, the processing sequence shown in FIGS. 5 and 6 is put to an end.

If F/MCND=1 in STEP12, then the deterioration evaluating device 17 acquires the present data of the output voltage VRST of the humidity sensor 19 in STEP14, and determines a present relative humidity VHUMD corresponding to the output voltage VRST in STEP15. The relative humidity VHUMD can be determined from the value of the output voltage VRST acquired in STEP14 based on a data table or a formula representative of the output characteristics of the humidity sensor 19 shown in FIG. 2.

Then, the deterioration evaluating device 17 compares the value of the relative humidity VHUMD and the preceding relative humidity parameter VHUMD/PRE with each other in STEP16. If VHUMD≧VHUMD/PRE, then the deterioration evaluating device 17 sets the value of a flag f/inc to "1" in STEP17. The flag f/inc is "1" when the humidity represented by the output voltage of the humidity sensor 19 is increasing, and the flag f/inc is "0" when the humidity represented by the output voltage of the humidity sensor 19 is decreasing. Thereafter, the deterioration evaluating device 17 performs the processing in STEP20. If VHUMD<VHUND/PRE, then the deterioration evaluating device 17 updates the value of the minimum humidity parameter VHUMD/MIN with the latest value of the relative humidity VHUMD determined in STEP15 in STEP18.

Then, the deterioration evaluating device 17 sets the value of the flag f/inc to "0" indicating that the relative humidity VHUMD is decreasing in STEP19. Then, the deterioration evaluating device 17 performs the processing in STEP20. According to the processing in STEP16 through STEP19, therefore, while the relative humidity VHUMD detected by the humidity sensor 19 is decreasing, the value of the minimum humidity parameter VHUMD/MIN is updated in each cycle time of the processing sequence of the deterioration evaluating device 17. While the relative humidity VHUMD is increasing, the value of the minimum humidity parameter VHUMD/MIN is not updated, but held to the minimum value of the relative humidity VHUMD (latest minimum value) immediately before the relative humidity VHUMD starts increasing.

In STEP20, the deterioration evaluating device 17 updates the value of the preceding relative humidity parameter VHUMD/PRE with the latest value of the relative humidity VHUMD determined in STEP15. Thereafter, the deterioration evaluating device 17 compares the latest value of the relative humidity VHUMD with a value (=VHUMD/MIN+ VHUMD/SK, hereinafter referred to as "temporary increase judgement threshold") which is the sum of the present value of the minimum humidity parameter VHUMD/MIN and a predetermined quantity VHUMD/SK (see FIG. 8 which will be described later on) in STEP21. If VHUMD≦the temporary increase judgement threshold, then the deterioration evaluating device 17 performs a decision process in STEP26 shown in FIG. 6 as described later on. If VHUMD>the temporary increase judgement threshold, then the deterioration evaluating device 17 determines the value of a flag f/sk in STEP22. The flag f/sk is set to "1" indicating that the relative humidity VHUMD temporarily changes from the minimum value to a tendency to increase monotonously, if the relative humidity VHUMD is increasing (f/inc=1) and the relative humidity VHUMD in the preceding cycle time is VHUMD≦the temporary increase judgement threshold, at the time when the relative humidity VHUMD in the present cycle time becomes VHUMD>the temporary increase judgement threshold. The flag f/sk is set to "0" at all times if the relative humidity VHUMD is decreasing (f/inc=0). After the flag f/sk is set to "1", it will be held to "1" insofar as the increasing state of the relative humidity VHUMD continues. Therefore, the time in the cycle time at which the value of the flag f/sk changes from "0" to "1" corresponds to a temporary changing timing (adsorption saturation timing) in the first aspect of the present invention. The flag f/sk has an initial value of "0".

If f/sk=0 in STEP22, i.e., if the relative humidity VHUMD changes from the decreasing state to the increasing state, takes a minimum value, thereafter keeps increasing and exceeds the temporary increase judgement threshold which is the sum of the minimum value and the predetermined quantity VHUMD/SK, then the deterioration evaluating device 17 sets the value of the flag f/sk to "1" in STEP23. The deterioration evaluating device 17 judges that the present cycle time is a temporary changing timing (adsorption saturation timing), and acquires the data of the present value of the integrated fuel injection quantity $\Sigma$tcyl from the ECU 16 in STEP24. Then, the deterioration evaluating device 17 stores the value of the integrated fuel injection quantity $\Sigma$tcyl temporarily as a deterioration evaluating parameter TPH at the adsorption saturation timing of the HC adsorbent 7 in STEP25. Then, the deterioration evaluating device 17 performs the decision process in STEP26 shown in FIG. 6. If f/sk=1 in STEP22, then the processing in STEP23 through STEP25 is skipped, and the decision process in STEP26 is performed.

In the decision process in STEP26, the deterioration evaluating device 17 determines the present value of the flag f/inc. If f/inc=0 indicating that the relative humidity VHUMD is decreasing, then since the relative humidity VHUMD is not in a monotonously increasing state, the deterioration evaluating device 17 sets the value of the flag f/sk to "0" in STEP27, and then performs a decision process in STEP28. If f/inc=1, then the deterioration evaluating device 17 keeps the value of the flag f/sk, and performs the decision process in STEP28.

Figure 8:
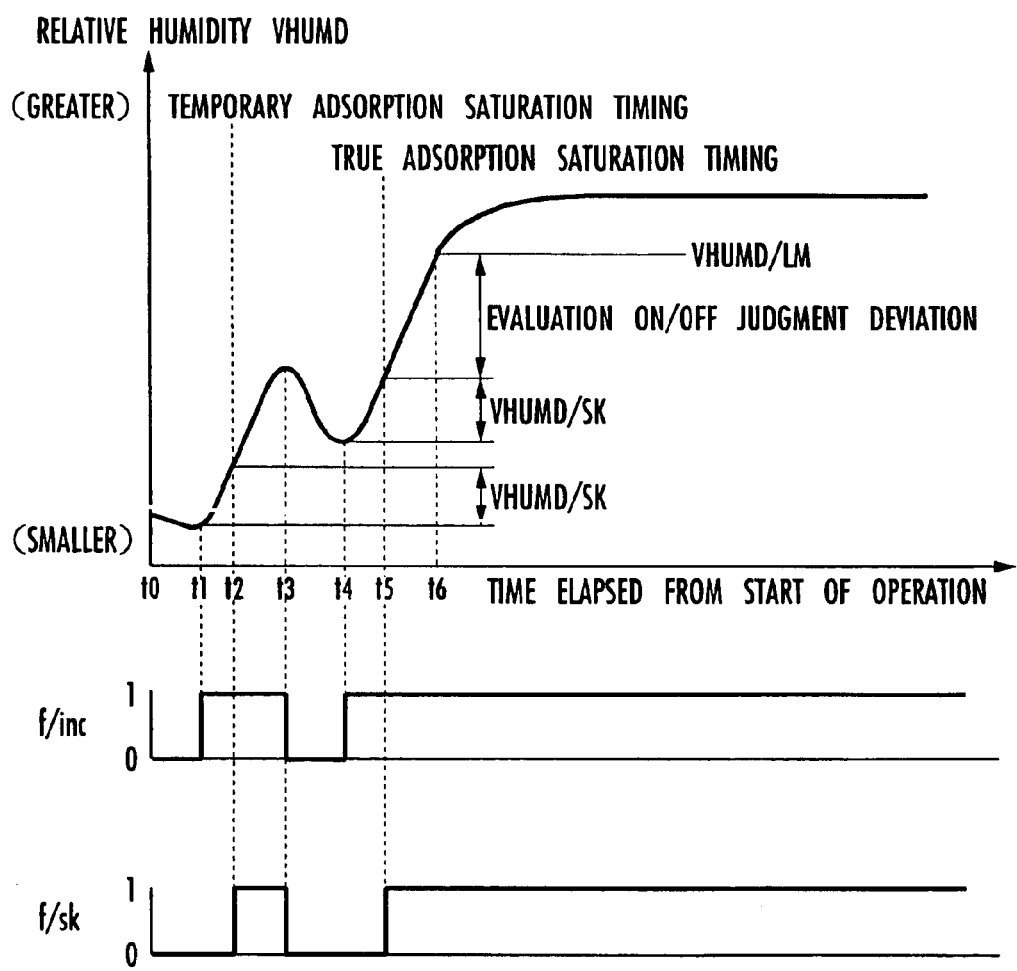
FIG. 8 is a diagram illustrative of the manner in which the deterioration evaluation processing apparatus according to the first embodiment of the present invention operates.

The manner in which the value of the flag f/inc and the value of the flag f/sk that are set as described above change will be described below with reference to FIG. 8. If the HC adsorbent 7 is deteriorated to a certain extent, then the humidity distribution in the exhaust pipe 5 tends to vary across the exhaust gas purifier 8, as described above. Therefore, as shown by an upper graph in FIG. 8, the relative humidity VHUMD based on the output voltage VRST of the humidity sensor 19 is liable to vary in a low humidity range immediately after the engine 1 starts to operate (in a period between times t0 and t5). Thereafter (subsequent to the time t5), the adsorption of moisture by the HC adsorbent 7 is saturated, and moisture in the exhaust gas is not adsorbed by the HC adsorbent 7, but passes through the HC adsorbent 7. As a result, the relative humidity VHUMD increases monotonously to a higher humidity. Finally, the relative humidity VHUMD converges to a substantially maximum humidity (about 100% humidity) that can be grasped by the output voltage VRST of the humidity sensor 19. In FIG. 8, the relative humidity VHUMD when the output voltage VRST of the humidity sensor 19 varies considerably greatly is illustrated for an easier understanding of the present invention.

When the relative humidity VHUMD undergoes such a transition, as shown by a middle graph in FIG. 8, the value of the flag f/inc is set to "0" in periods (a period between the times t0 and t1 and a period between the times t3 and t4) in which the relative humidity VHUMD is decreasing, and set to "1" in periods (a period between the times t0 and t3 and a period after the time t4) in which the relative humidity VHUMD is increasing (or constant). As shown by a lower graph in FIG. 8, the value of the flag f/sk is temporarily changed from "0" to "1" at the time t2 when the relative humidity VHUMD exceeds the temporary increase judgement threshold which is the sum of the minimum value of the relative humidity VHUMD at the time t1 and the predetermined quantity VHUMD/SK. Thereafter, when the relative humidity VHUMD starts to decrease at the time t3, the value of the flag f/sk is reset to "0" at the time t3.

The relative humidity VHUMD then takes a minimum value at the time t4. At the time t5 when the relative humidity VHUMD exceeds the temporary increase judgement threshold which is the sum of the minimum value of the relative humidity VHUMD at the time t4 and the predetermined quantity VHUMD/SK, the value of the flag f/sk changes from "0" to "1" again. Since the relative humidity VHUMD keeps increasing after the time t5 in the example shown in FIG. 8, the value of the flag f/sk is maintained as "1". According to the present embodiment, the times t2, t5 are detected as temporary changing timings (adsorption saturation timings) according to the first aspect of the present invention. Basically, the temporary changing timing that is finally detected (the time t5) is determined as a true temporary changing timing according to the first aspect of the present invention.

Referring back to FIG. 6, the deterioration evaluating device 17 determines the present value of the flag f/sk in STEP28. If f/sk=0, i.e., if no adsorption saturation timing is detected or the relative humidity VHUMD decreases after an adsorption saturation timing has temporarily been detected, then the processing sequence shown in FIGS. 5 and 6 is put to an end. If f/sk=1 in STEP28, then the deterioration evaluating device 17 compares the present value of the relative humidity VHUMD with a predetermined upper limit value VHUMD/LM (see FIG. 8) in STEP29. The upper limit value VHUMD/LM is a value close to the maximum relative humidity VHUMD (relative humidity substantially close to 100%) that can be grasped from the output voltage VRST of the humidity sensor 19. Specifically, the upper limit value VHUMD/LM is a value close to, and slightly smaller than, a steady value that is finally reached (converged to) by the relative humidity VHUMD downstream of the HC adsorbent 7 as it increases after a changing timing. If VHUMD≦VHUMD/LM (between the times t2, t3 in FIG. 8), since the relative humidity VHUMD is not yet sufficiently increased, the processing sequence shown in FIGS. 5 and 6 is put to an end.

If VHUMD>VHUMD/LM (at a time t6 in FIG. 8), then the deterioration evaluating device 17 compares the deviation (=VHUMD/LM−(VHUMD/MIN+VHUMD/SK), hereinafter referred to as "evaluation on/off judgement deviation") between the upper limit value VHUMD/LM and the present value of the temporary increase judgement threshold (=VHUMD/MIN+VHUMD/SK) with a predetermined lower limit value VHUMD/HT in STEP30. If the evaluation on/off judgement deviation>VHUMD/HT, then the deterioration evaluating device 17 judges that the temporary changing timing (adsorption saturation timing) at which the value of the flag f/sk has finally changed from "0" to "1" is a true changing timing, and carries out a deterioration evaluation determining process for determining an evaluation of the deteriorated state of the HC adsorbent 7, using the value of the deterioration evaluating parameter TPH (the latest value of the deterioration evaluating parameter TPH) at that timing, as described later on, in STEP31. Thereafter, the processing sequence shown in FIGS. 5 and 6 is put to an end. If the evaluation on/off judgement deviation≦VHUMD/HT in STEP30, then since the increase of the relative humidity VHUMD from the temporary changing timing is too small and that changing timing is not reliable enough as an adsorption saturation timing, the deterioration evaluating device 17 does not carry out the deterioration evaluation determining process, but judges that an evaluation of the deteriorated state of the HC adsorbent 7 is completed in the present cycle of operation of the engine 1, and sets the value of the flag F/DONE to "1" in STEP32. Thereafter, the deterioration evaluating device 17 puts the processing sequence shown in FIGS. 5 and 6 to an end. The situation where the evaluation on/off judgement deviation≦VHUMD/HT in STEP30 represents a state in which the relative humidity VHUMD tends to increase as a whole while repeatedly varying frequently due to disturbances or the like.

Figure 7:
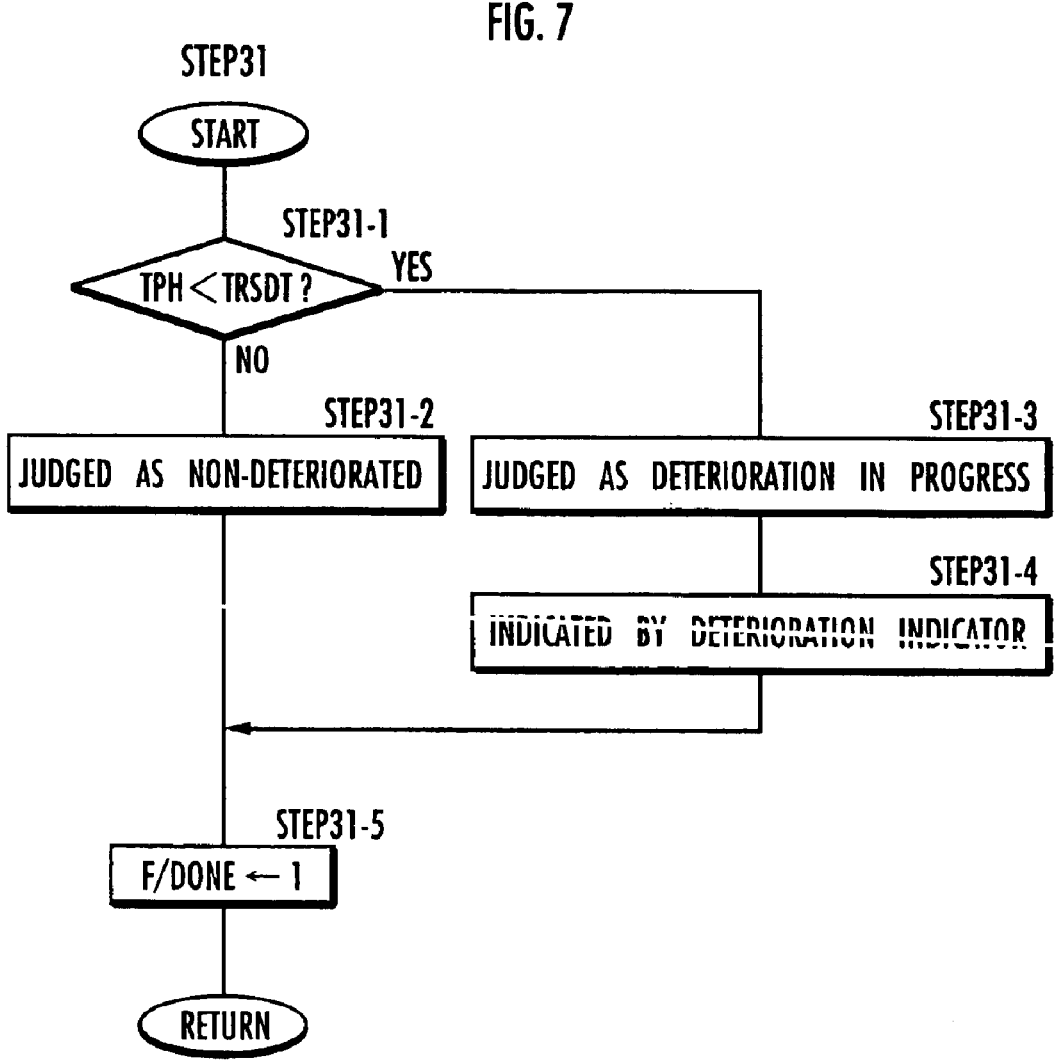
FIG. 7 is a flowchart of a subroutine in the substantial portion of the flowchart shown in FIG. 6.

The deterioration evaluation determining process in STEP31 is carried out as shown in FIG. 7. The deterioration evaluating device 17 compares the present value of the deterioration evaluating parameter TPH (which is the value of the integrated fuel injection quantity Σtcyl at the time the flag f/sk has finally set to "1" from "0", and corresponds to the integrated amount of moisture adsorbed by the HC adsorbent 7 at a true changing timing (adsorption saturation timing)) with a deterioration evaluating threshold TRSDT determined in STEP8 shown in FIG. 3 at the time the engine 1 has started to operate, in STEP31-1.

If TPH≦TRSDT, then since the HC adsorbent 7 is capable of sufficiently adsorbing moisture and hence HCs in the exhaust gas, the deterioration evaluating device 17 judges that the HC adsorbent 7 is in the non-deteriorated state in STEP31-2. Then, the deterioration evaluating device 17 judges that the evaluation of the deteriorated state of the HC adsorbent 7 is completed, and sets the value of the flag F/DONE to "1" in STEP31-5. Thereafter, control returns to the main routine shown in FIGS. 5 and 6.

If TPH<TRSDT in STEP31-1, then since the amount of moisture and hence HCs in the exhaust gas which can be adsorbed by the HC adsorbent 7 is small, the deterioration evaluating device 17 judges that the HC adsorbent 7 is in the deterioration-in-progress state in STEP31-3. The deterioration evaluating device 17 controls the deterioration indicator 18 to indicate that the HC adsorbent 7 is in the deterioration-in-progress state in STEP31-4. Thereafter, the deterioration evaluating device 17 judges that the evaluation of the deteriorated state of the HC adsorbent 7 is completed, and sets the value of the flag F/DONE to "1" in STEP31-5. Thereafter, control returns to the main routine shown in FIGS. 5 and 6.

According to the process described above which is carried out by the deterioration evaluating device 17, it is possible to properly grasp a true changing timing at which the relative humidity VHUMD detected by the humidity sensor 19 downstream of the HC adsorbent 7 starts to increase monotonously after having had the last minimum value, i.e., an adsorption saturation timing at which the absorption by the HC adsorbent 7 of moisture and hence HCs in the exhaust gas is saturated. The integrated fuel injection quantity Σtcyl as the deterioration evaluating parameter TPH at the true adsorption saturation timing is compared with the deterioration evaluating threshold TRSDT which is set depending on the engine temperature TW representative of the temperature of the HC adsorbent 7 upon the start of the operation of the engine 1, for appropriately and accurately grasping the deteriorated state of the HC adsorbent 7. If the evaluation on/off judgement deviation is excessively small, then the deteriorated state of the HC adsorbent 7 is not evaluated. Therefore, the reliability of the result representing the deteriorated state of the HC adsorbent 7 which is evaluated by the apparatus according to the present embodiment is increased.

The ECU 16 receives data indicating that the adsorption of HCs by the HC adsorbent 7 is saturated from the deterioration evaluating device 17. After the ECU 16 receives such data, it operates the directional control valve 15 to move to the imaginary-line position in FIG. 1 with the non-illustrated motor. The ECU 16 also opens the on/off valve 14 in the EGR passage 13 for a predetermined period of time. At this time, most of the exhaust gas emitted from the engine 1 flows through the exhaust pipe 5 into the atmosphere, and the remainder of the exhaust gas returns through the bypass exhaust passage 10 and the EGR passage 13 to the intake side of the engine 1. While the HC adsorbent 7 is adsorbing HCs in the exhaust gas, the catalytic converter 6 is heated and activated by the heat of the exhaust gas to purify the exhaust gas. As the temperature of the HC adsorbent 7 increases, it releases the adsorbed HCs, which are returned through the EGR passage 13, and then supplied together with the air-fuel mixture to the engine 1 and combusted thereby.

An apparatus of the second embodiment of the present invention will be described below with reference to FIGS. 9 through 12. The second embodiment of the present invention corresponds to the first aspect of the present invention. The second embodiment differs from the first embodiment only as to the processing sequence of the deterioration evaluating device. Therefore, those parts and functions of the second embodiment which are identical to those of the first embodiment are denoted by identical reference characters, and will not be described in detail below.

In the first embodiment, the deterioration evaluating device 17 determines the relative humidity VHUMD from the output voltage VRST of the humidity sensor 19. According to the second embodiment, the output voltage VRST of the humidity sensor 19 is employed as it is. Since the output characteristics of the humidity sensor 19 are negative with respect to the humidity as shown in FIG. 2, the output voltage VRST of the humidity sensor 19 increases as the relative humidity VHUMD decreases, and the output voltage VRST of the humidity sensor 19 decreases as the relative humidity VHUMD increases. Therefore, when the relative humidity VHUMD represented by the output voltage VRST of the humidity sensor 19 takes a minimum value, the output voltage VRST takes a maximum value.

Figure 9:
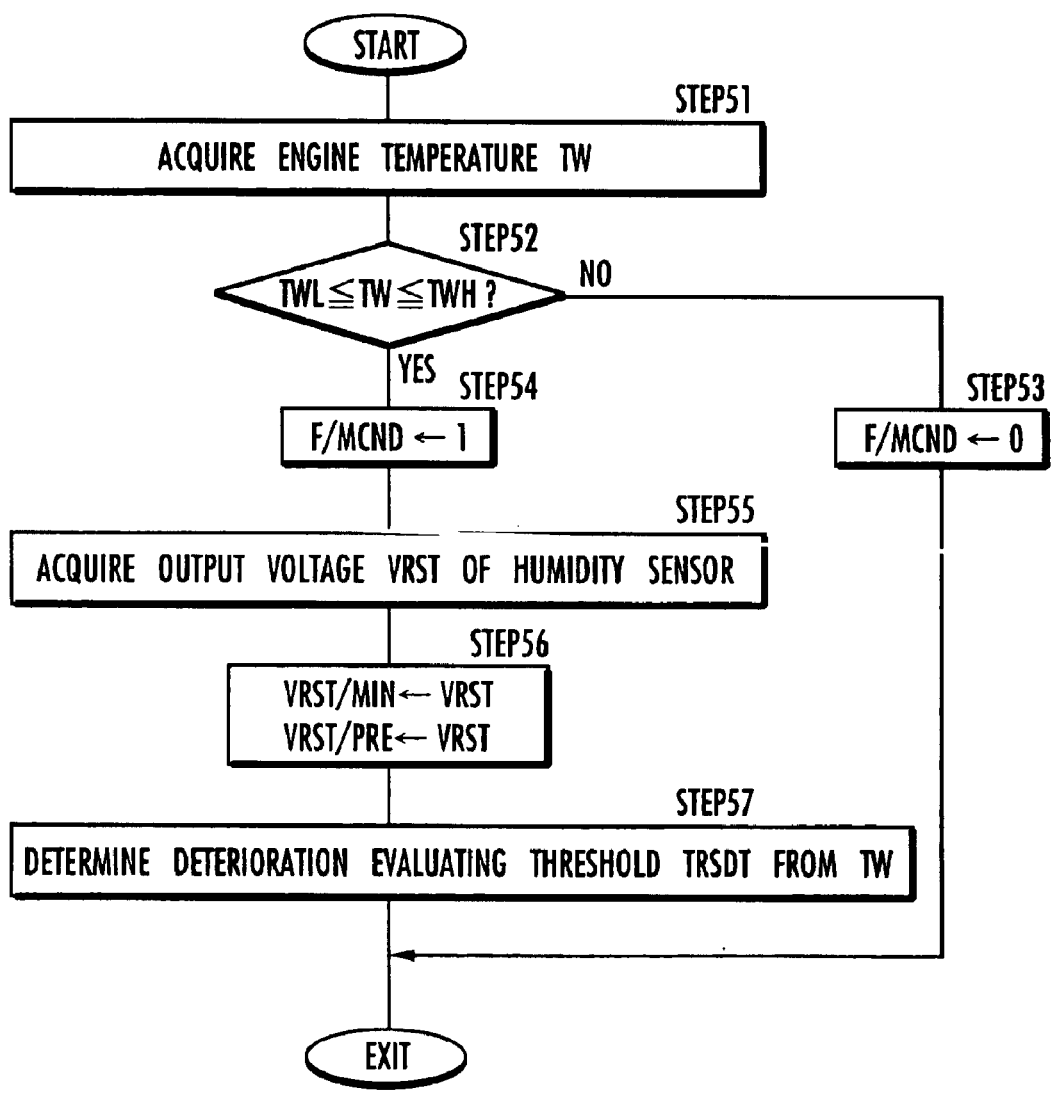
FIGS. 9 through 11 are flowcharts of processing sequences of the deterioration evaluation processing apparatus according to the second embodiment of the present invention.

In view of the above behavior, the deterioration evaluating device 17 according to the second embodiment evaluates the deteriorated state of the HC adsorbent 7 as follows:

When the engine 1 starts operating, the deterioration evaluating device 17 performs a processing sequence shown in FIG. 9. The processing sequence shown in FIG. 9 corresponds to the processing sequence shown in FIG. 3 according to the first embodiment. The processing in STEP51 through STEP55 in FIG. 9 is identical to the processing in STEP1 through STEP5 shown in FIG. 3. In STEP56 following STEP55, the deterioration evaluating device 17 stores the present value of the output voltage VRST of the humidity sensor 19 acquired in STEP55 as the value of a parameter VRST/MAX (hereinafter referred to as "maximum voltage parameter VRST/MAX") representative of the latest value of a maximum value of the output voltage VRST of the humidity sensor 19 and the value of a parameter VRST/PRE (hereinafter referred to as "preceding voltage parameter VRST/PRE") representative of a preceding value of the output voltage VRST. The maximum voltage parameter VRST/MAX and the preceding voltage parameter VRST/PRE correspond respectively to the minimum humidity parameter VHUMD/MIN and the preceding relative humidity parameter VHUMD/PRE according to the first embodiment.

Then, the deterioration evaluating device 17 determines a deterioration evaluating threshold TRSDT from the engine temperature TW of the engine 1 according to the solid-line data table in FIG. 4 in the same processing as in STEP8 shown in FIG. 3 in STEP57. Thereafter, the processing sequence shown in FIG. 9 is put to an end.

Figure 10:
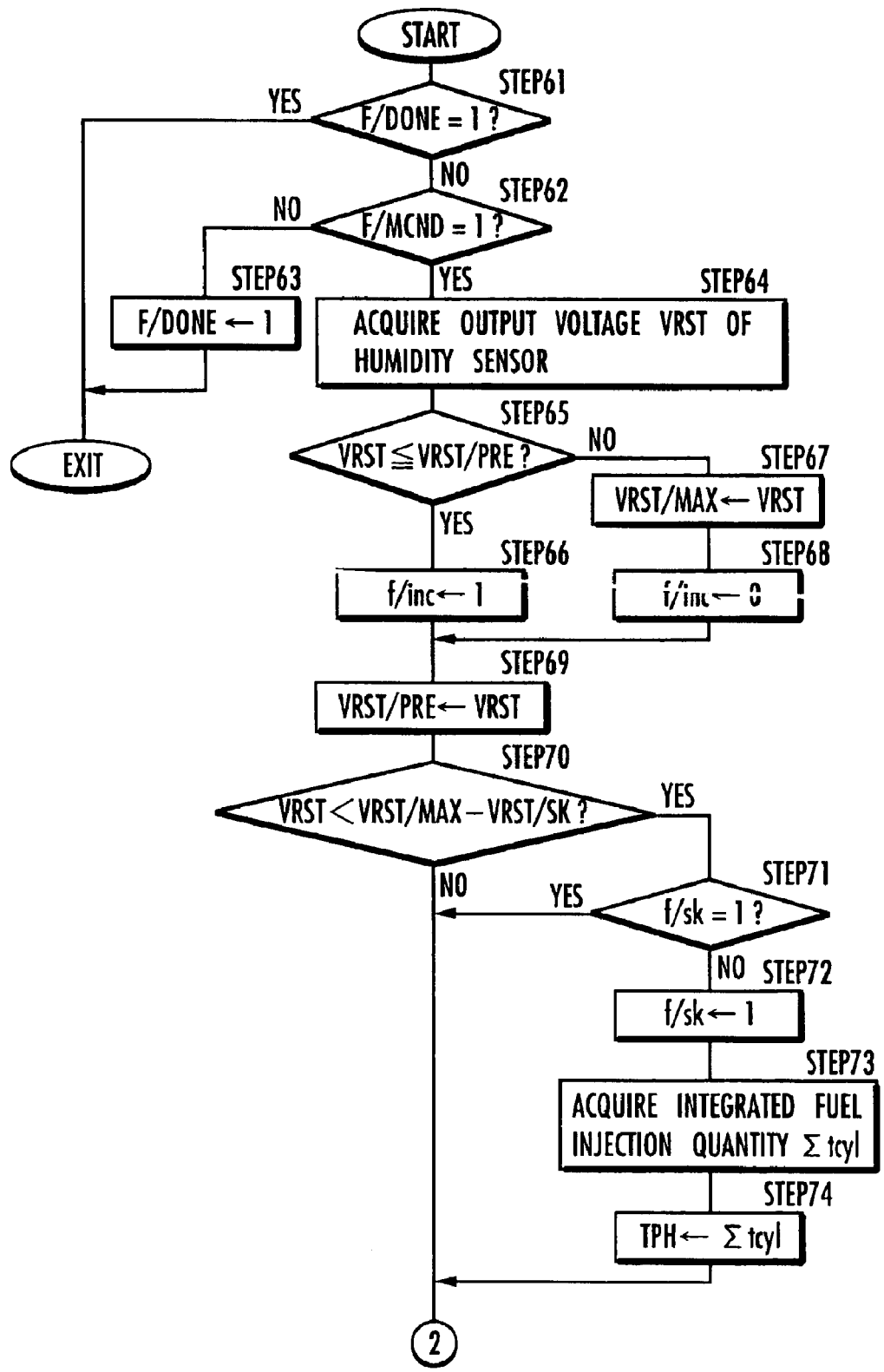
Figure 11:
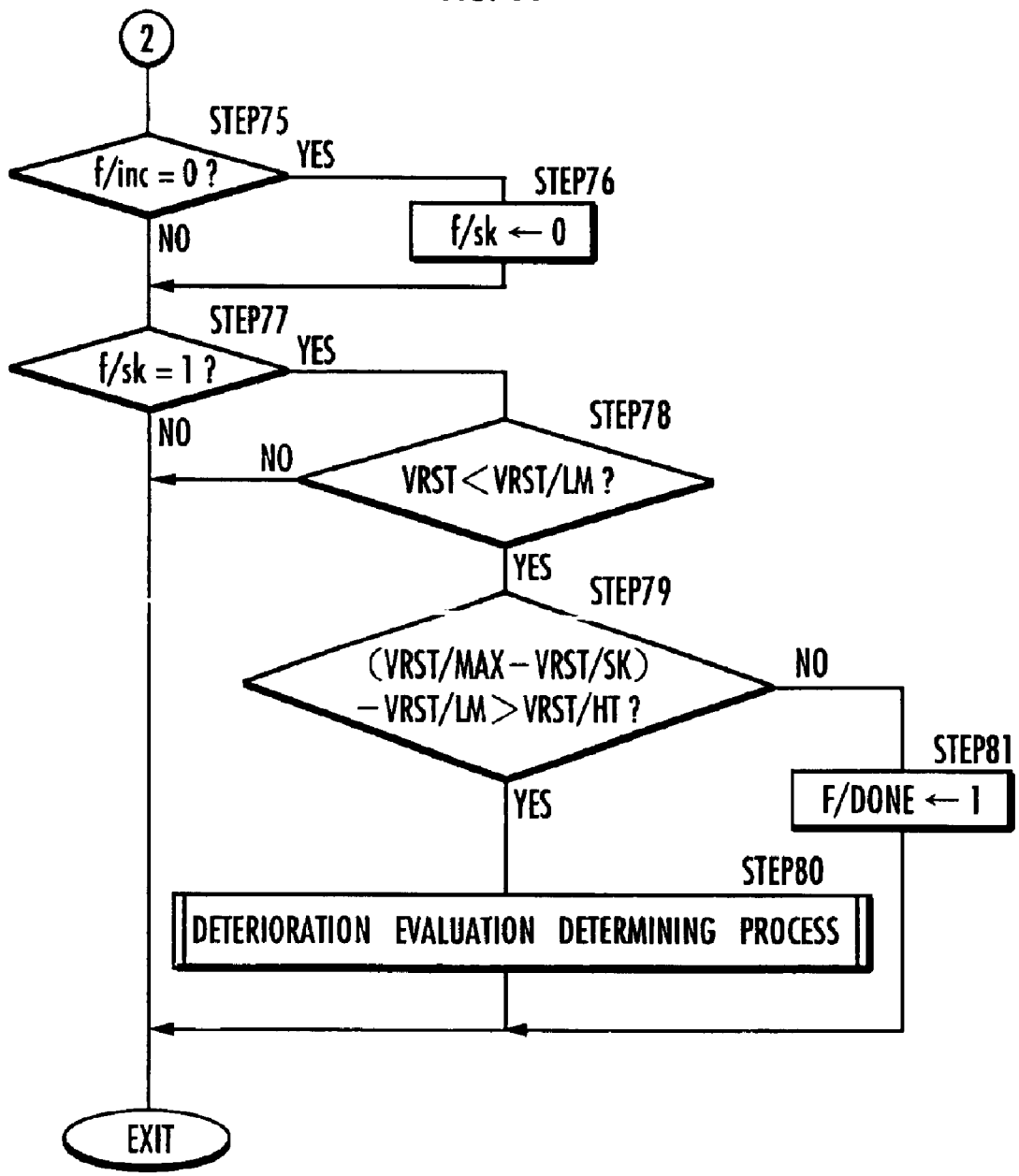

After having performed the processing sequence shown in FIG. 9 at the time the engine 1 starts to operate, the deterioration evaluating device 17 performs a processing sequence shown in FIGS. 10 and 11 in a predetermined cycle time. The processing sequence shown in FIGS. 10 and 11 corresponds to the processing sequence shown in FIGS. 5 and 6 according to the first embodiment.

In the processing sequence shown in FIGS. 10 and 11, the processing in STEP61 through STEP64 is identical to STEP11 through STEP14 in the processing sequence according to the first embodiment. In STEP65 following STEP64, the deterioration evaluating device 17 compares the present value of the output voltage VRST of the humidity sensor 19 acquired in STEP54 with the preceding voltage parameter VRST/PRE. If VRST≦VRST/PRE, then the deterioration evaluating device 17 judges that the humidity represented by the output voltage VRST of the humidity sensor 19 is increasing (the output voltage VRST is decreasing), and sets the value of the flag f/inc (described in the first embodiment) too "1" in STEP66. If VRST<VRST/ PRE, then the deterioration evaluating device 17 judges that the humidity represented by the output voltage VRST of the humidity sensor 19 is decreasing (the output voltage VRST is increasing), and updates the value of the maximum voltage parameter VRST/MAX with the present value of the output voltage VRST in STEP67. Then, the deterioration evaluating device 17 sets the value of the flag f/inc to "0" in STEP68.

Then, the deterioration evaluating device 17 updates the preceding-voltage parameter VRST/PRE with the present value of the output voltage VRST in STEP69. Thereafter, the deterioration evaluating device 17 compares the present value of the output voltage VRST with a value (=VRST/ MAX−VRST/SK) that is produced by subtracting a predetermined quantity VRST/SK from the present value of the maximum voltage parameter VRST/MAX in STEP70. The value (=VRST/MAX−VRST/SK) that is compared with the present value of the output voltage VRST is equivalent to the temporary increase judgement threshold according to the first embodiment as it is represented in terms of the output voltage of the humidity sensor 19. In the present embodiment, this value (=VRST/MAX−VRST/SK) will be referred to as "temporary decrease judgement threshold".

If VRST≧the temporary decrease judgement threshold (this is the same as if VHUMD≦temporary increase judgement threshold in STEP21 according to the first embodiment), then the deterioration evaluating device 17 performs a decision process in STEP75 in FIG. 11. If VRST<the temporary decrease judgement threshold, then the deterioration evaluating device 17 determines the value of the flag f/sk described in the first embodiment in STEP71.

If f/sk=0, then the deterioration evaluating device 17 effects,the same processing as in STEP23 through STEP25 according to the first embodiment in STEP72 through STEP74, and then performs the decision process in STEP75 in FIG. 11. If f/sk=1 in STEP71, then the deterioration evaluating device 17 performs the decision process in STEP75 in FIG. 11.

The decision process in STEP75 is the same as the decision process in STEP 26 according to the first embodiment. That is, the deterioration evaluating device 17 determines the value of the flag f/inc in STEP75. Only if f/inc=0 as with the first embodiment, the deterioration evaluating device 17 resets the value of the flag f/sk to "0" in STEP76.

Figure 12:
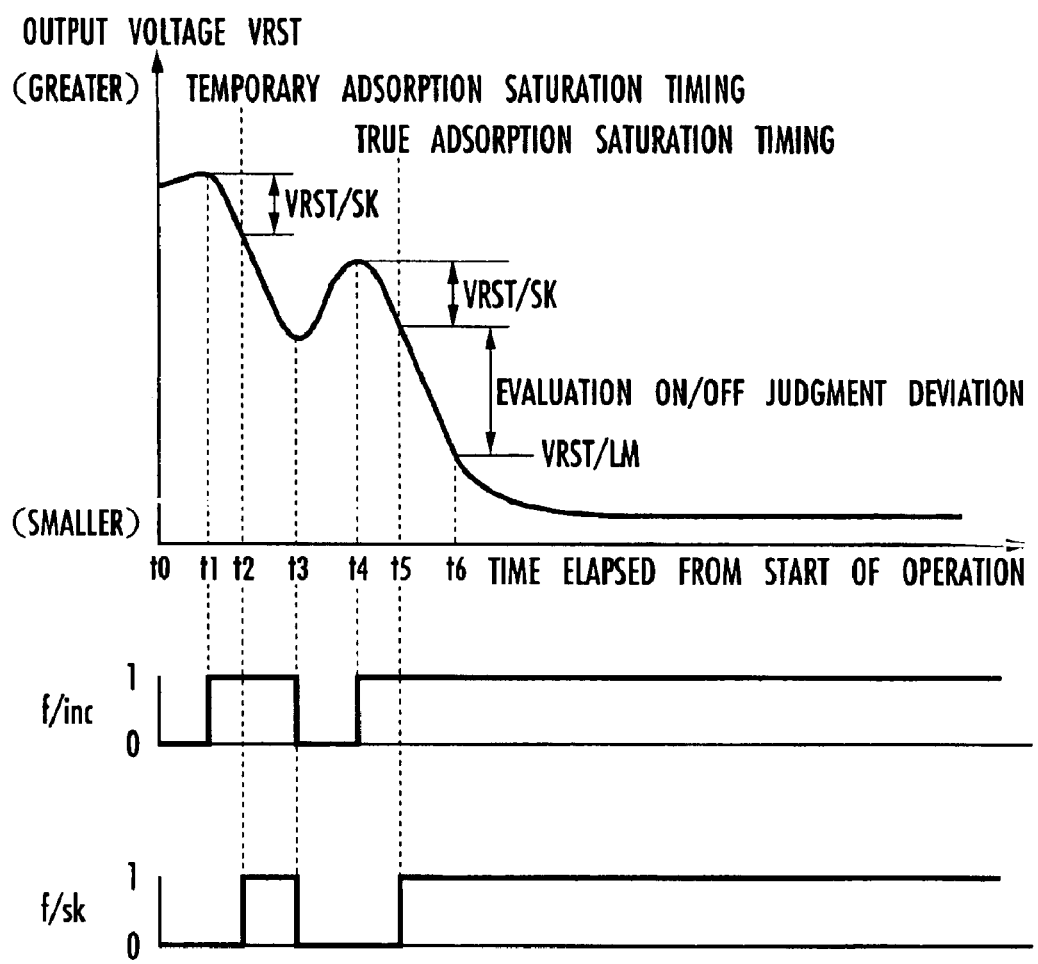
FIG. 12 is a diagram illustrative of the manner in which the deterioration evaluation processing apparatus according to the second embodiment of the present invention operates.

The manner in which the value of the flag f/inc and the value of the flag f/sk that are set as described above in the present embodiment change will be described below with reference to FIG. 12. After the engine 1 has started to operate, the output voltage VRST of the humidity sensor 19 decreases and increases when the relative humidity VHUMD represented by the output voltage VRST increases and decreases, respectively. Therefore, when the relative humidity VHUMD varies as shown in FIG. 8, the output voltage VRST of the humidity sensor 19 varies as shown by an upper graph in FIG. 12.

When the output voltage VRST thus changes, the value of the flag f/inc is set to "0" in periods (a period between the times t0 and t1 and a period between the times t3 and t4) in which the output voltage VRST is increasing, i.e., the relative humidity VHUMD is decreasing, and set to "1" in periods (a period between the times t1 and t3 and a period after the time t4) in which the output voltage VRST is decreasing (or constant), i.e., the relative humidity VHUMD is increasing. As shown by a lower graph in FIG. 12, the value of the flag f/sk is temporarily changed from "0" to "1" at a time t2 (which is the same as the time t2 in FIG. 8) when the output voltage VRST becomes lower than the temporary decrease judgement threshold which is produced by subtracting the predetermined quantity VRST/SK from the maximum value of the output voltage VRST at the time t1. Thereafter, when the output voltage VRST starts to increase at the time t3, or stated otherwise when the relative humidity VHUMD starts to decrease at the time t3, the value of the flag f/sk is reset to "0" at the time t3.

When the relative humidity VHUMD takes a minimum value again at the time t4, the output voltage VRST takes a maximum value. At a time t5 (which is the same as the time t5 in FIG. 8) when the output voltage VRST becomes lower than the temporary decrease judgement threshold which is produced by subtracting the predetermined quantity VRST/ SK from the maximum value of the output voltage VRST, the value of the flag f/sk is changed from "0" to "1" again. In the example shown in FIG. 12, after the time t5, the output voltage VRST keeps decreasing, or stated otherwise the relative humidity VHUMD keeps increasing, so that the value of the flag f/sk is kept as "1". Therefore, the value of the flag f/sk according to the present embodiment is set at exactly the same timing as with the first embodiment. The times t2, t5 are detected as temporary changing timings (adsorption saturation timings) according to the first aspect of the present invention. In the example shown in FIG. 12, the temporary changing timing that is finally detected (the time t5) is determined as a true temporary changing timing (true adsorption saturation timing) according to the present invention.

Referring back to FIG. 11, the deterioration evaluating device 17 determines the present value of the flag f/sk in STEP77 following STEP75 and STEP76, as with STEP28 according to the first embodiment. If f/sk=0, i.e., if no changing timing is detected or the output voltage VRST increases after a changing timing has temporarily been detected, then the processing sequence shown in FIGS. 10 and 11 is put to an end. If f/sk=1 in STEP77, then the deterioration evaluating device 17 compares the present value of the output voltage VRST with a predetermined lower limit value VRST/LM (see FIG. 12) in STEP78. The lower limit value VRST/LM is equivalent to the upper limit value VHUMD/LM for the relative humidity VHUMD according to the first embodiment as it is represented in terms of the output voltage VRST of the humidity sensor 19. If VRST≧VRST/LM (between the times t2, t3 in FIG. 12), since the output voltage VRST is not yet sufficiently decreased (the relative humidity VHUMD is not yet sufficiently increased), the processing sequence shown in FIGS. 10 and 11 is put to an end.

If VRST<VRST/LM (at a time t6 in FIG. 12), then the deterioration evaluating device 17 compares an evaluation on/off judgement deviation which is the deviation (=(VRST/ MAX −VRST/SK)−VRST/LM) between the lower limit value VRST/LM and the present value of the temporary decrease judgement threshold (=VRST/MAX−VRST/SK) with a predetermined lower limit value VRST/HT in STEP79. The evaluation on/off judgement deviation corresponds to the evaluation on/off judgement deviation (=VHUMD/LM−(VHUMD/MIN+VHUMD/SK)) in the first embodiment. The lower limit value VRST/HT is equivalent to the upper limit value VHUMD/HT used in STEP30 according to the first embodiment as it is represented in terms of the output voltage of the humidity sensor 19.

If the evaluation on/off judgement deviation>VRST/HT, then in exactly the same fashion as with the first embodiment, the deterioration evaluating device 17 judges that the temporary changing timing (adsorption saturation timing) at which the value of the flag f/sk has finally changed from "0" to "1" is a true adsorption saturation timing, and carries out a deterioration evaluation determining process for determining an evaluation of the deteriorated state of the HC adsorbent 7, using the value of the deterioration evaluating parameter TPH (the latest value of the deterioration evaluating parameter TPH) at that timing, in STEP80. Thereafter, the processing sequence shown in FIGS. 10 and 11 is put to an end. If the evaluation on/off judgement deviation≦VRST/HT in STEP79, then since the decrease of the output voltage VRST from the temporary changing timing is too small and that changing timing is not reliable enough as a true adsorption saturation timing, the deterioration evaluating device 17 does not carry out the deterioration evaluation determining process, but judges that an evaluation of the deteriorated state of the HC adsorbent 7 is completed in the present cycle of operation of the engine 1, and sets the value of the flag F/DONE to "1" in STEP81, in the same manner as with the first embodiment. Thereafter, the deterioration evaluating device 17 puts the processing sequence shown in FIGS. 10 and 11 to an end. The deterioration evaluation determining process in STEP80 is identical to the deterioration evaluation determining process in STEP31 according to the first embodiment, and is carried out according to the processing sequence shown in FIG. 7.

The apparatus according to the second embodiment offers the same advantages as those of the apparatus according to the first embodiment, and is capable of accurately and appropriately evaluating the deteriorated state of the HC adsorbent 7.

A third embodiment of the present invention will be described below with reference to FIGS. 13 through 17. The third embodiment of the present invention corresponds to the second aspect of the present invention. Those parts and functions of the third embodiment which are identical to those of the first embodiment are denoted by identical reference characters, and will not be described in detail below.

Figure 13:
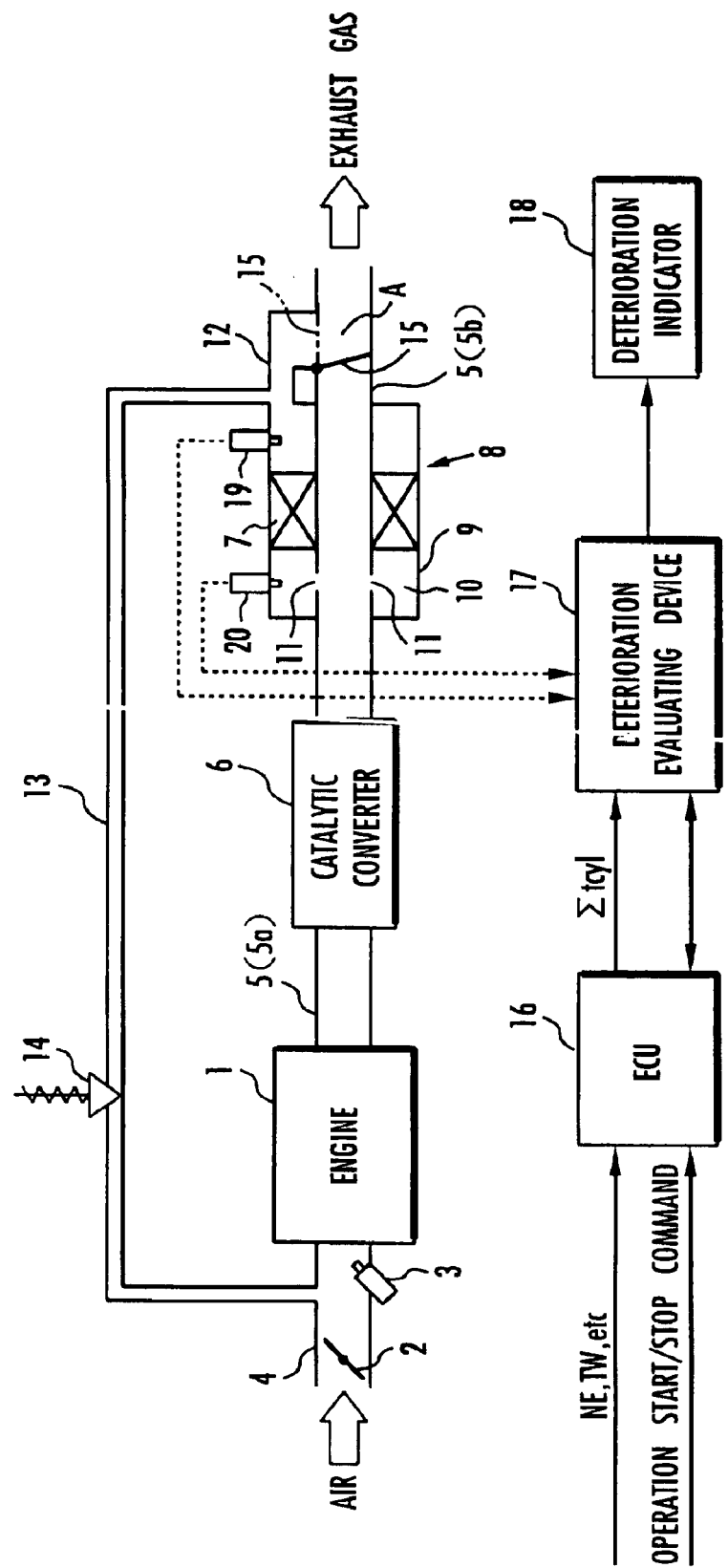
FIG. 13 is a block diagram of an overall system arrangement of an apparatus according to a third embodiment of the present invention.

As shown in FIG. 13, the third embodiment has the humidity sensor 19 disposed downstream of the HC adsorbent 7 of the exhaust gas humidifier 8 as with the first embodiment, and also has a humidity sensor 20 disposed upstream of the HC adsorbent 7 for detecting the humidity (relative humidity) of the exhaust gas that enters the HC adsorbent 7. The humidity sensor 20 is mounted on the housing 9 upstream of the HC adsorbent 7 closely thereto. The humidity sensor 20 is of the same type as the humidity sensor 19 described above in the first embodiment, and has the same output characteristics (see FIG. 2) as the humidity sensor 19. The output voltage of the humidity sensor 20 and also the output voltage of the humidity sensor 19 are supplied to the deterioration evaluating device 17 for evaluating a deteriorated state of the HC adsorbent 7. In the present embodiment, the humidity sensors 19, 20 correspond respectively to a downstream humidity sensor and an upstream humidity sensor according to the second aspect of the present invention. Other structural details of the third embodiment are identical to those of the first embodiment.

Operation of the apparatus according to the present embodiment for evaluating a deteriorated state of the HC adsorbent 7 will be described in detail below. When the operation switch (not shown) is turned on to start operation of the engine 1, the ECU 16 and the deterioration evaluating device 17 are activated. The ECU 16 performs exactly the same processing sequence as with the first embodiment.

Figure 14:
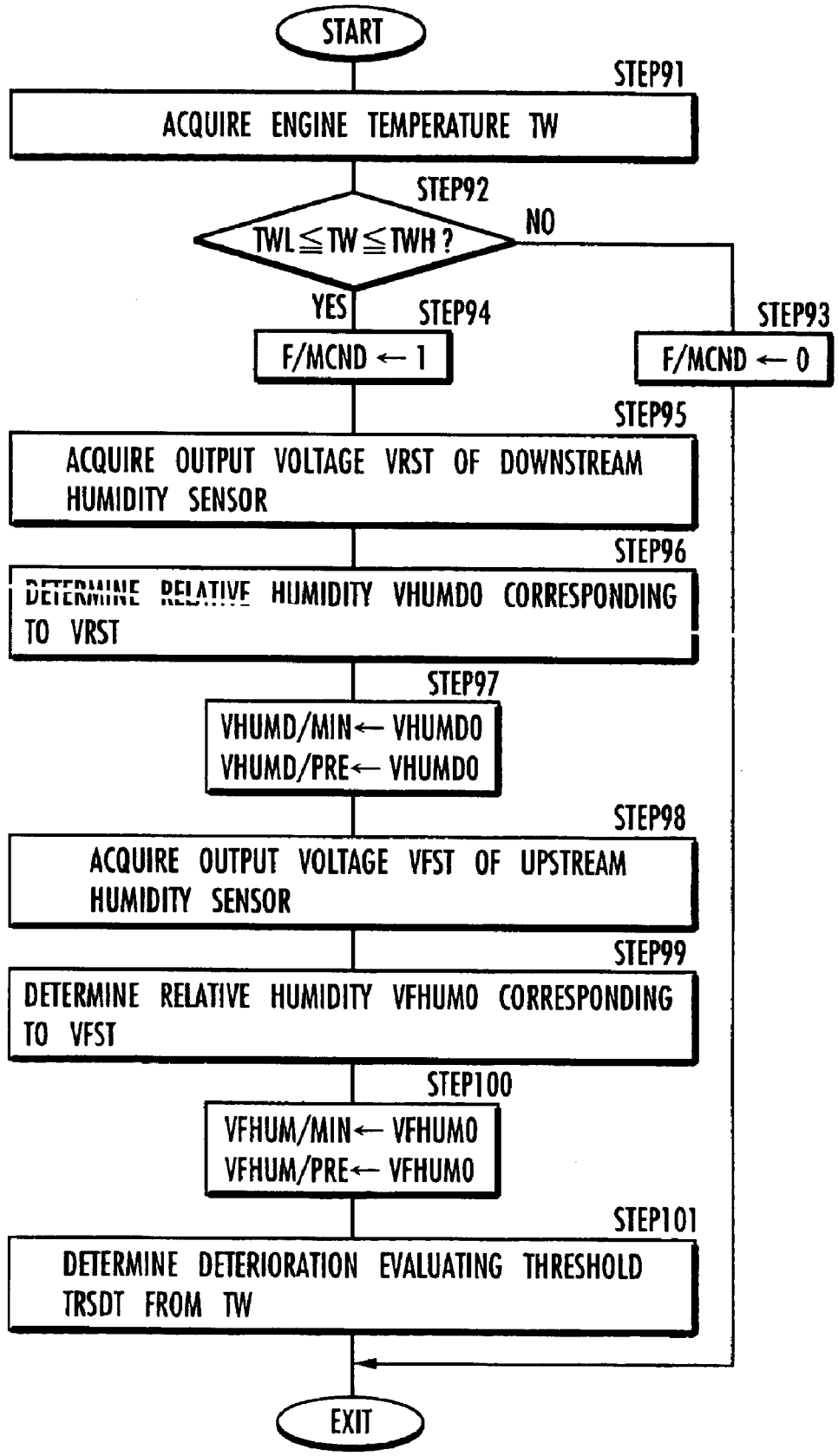
FIGS. 14 through 16 are flowcharts of processing sequences of the deterioration evaluation processing apparatus according to the third embodiment of the present invention.

After the deterioration evaluating device 17 is activated, it performs a processing sequence shown in FIG. 14. The processing sequence shown in FIG. 14 corresponds to the processing sequence shown in FIG. 3 according to the first embodiment, and is performed only when the engine 1 starts operating. The processing in STEP91 through STEP97 in FIG. 14 is identical to the processing in STEP1 through STEP7 shown in FIG. 3 according to the first embodiment. In the present embodiment, the deterioration evaluating device 17 performs the processing in STEP98 through STEP100 following STEP97. In STEP98 through STEP100, the deterioration evaluating device 17 performs the same processing as the processing in STEP95 through STEP97 for the downstream humidity sensor 19, with respect to the upstream humidity sensor 20. Specifically, in STEP98, the deterioration evaluating device 17 acquires the present data of the output voltage VFST of the upstream humidity sensor 20. Then, the deterioration evaluating device 17 determines a relative humidity VFHUM0 corresponding to the output voltage VFST as an initial relative humidity upstream of the HC adsorbent 7 (in the location of the humidity sensor 20) at the start of operation of the engine 1 in STEP99. The initial relative humidity VFHUM0 is determined from the value of the output voltage VFST acquired in STEP98 based on a data table or a formula representative of the output characteristics of the upstream humidity sensor 20 shown in FIG. 2.

The deterioration evaluating device 17 then stores the value of the initial relative humidity VFHUM0 as the value of a minimum humidity parameter VFHUM/MIN representative of the latest value of a minimum value of a humidity (relative humidity) in the location of the humidity sensor 20 upstream of the HC adsorbent 7, and the value of a preceding relative humidity parameter VFHUM/PRE representative of a preceding value of the relative humidity (a preceding value in each cycle time of the process carried out by the deterioration evaluating device 17) in STEP100. That is, the deterioration evaluating device 17 initializes the values of these parameters VFHUM/MIN, VFHUM/PRE with the value of the initial relative humidity VFHUM0 as the humidity (relative humidity) upstream of the HC adsorbent 7 at the time the engine 1 starts to operate.

After having performed the processing in STEP98 through STEP100, the deterioration evaluating device 17 performs the processing in STEP101. Then, the deterioration evaluating device 17 puts the processing sequence shown in FIG. 14 to an end. The processing in STEP101 is the same as the processing in STEP8 shown in FIG. 3 according to the first embodiment. The deterioration evaluating device 17 determines a deterioration evaluating threshold TRSDT with which to determine whether the HC adsorbent 7 is in the deterioration-in-progress state or the non-deteriorated state from the detected data of the initial engine temperature TW acquired in STEP91 according to a predetermined data table as indicated by the imaginary-line curve in FIG. 4. The data table as indicated by the imaginary-line curve in FIG. 4 is determined by way of experimentation or the like such that, as with the first embodiment, the deterioration evaluating threshold TRSDT is greater as the engine temperature TW (the temperature of the HC adsorbent 7) is lower. In the present embodiment, since the timing to calculate the deterioration evaluating parameter is later than the time when the engine 1 starts to operate, as will be described later, the deterioration evaluating threshold TRSDT (represented by the imaginary-line curve in FIG. 4) is smaller a substantially constant value than the deterioration evaluating threshold TRSDT in the first embodiment.

Figure 15:
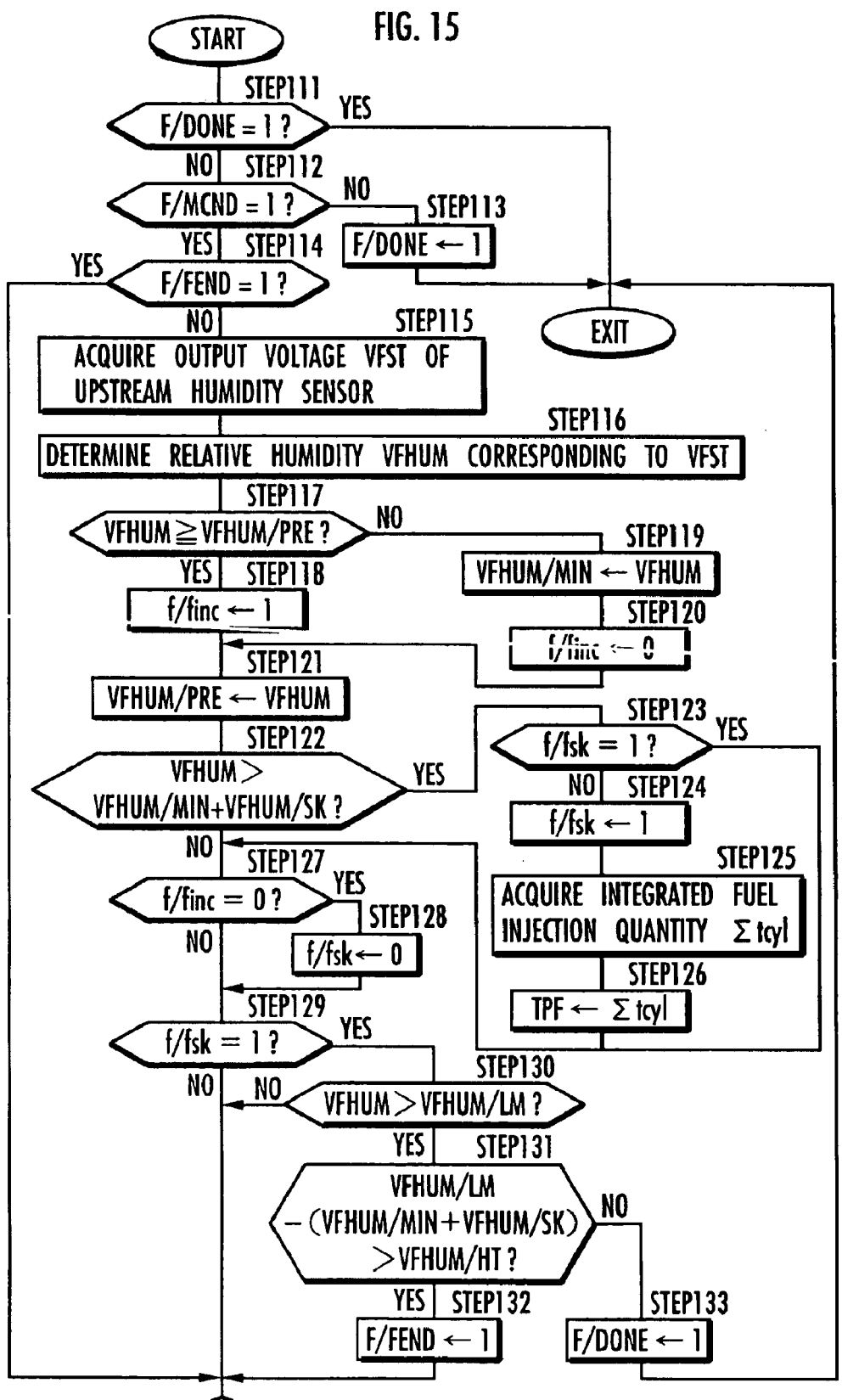
Figure 16:
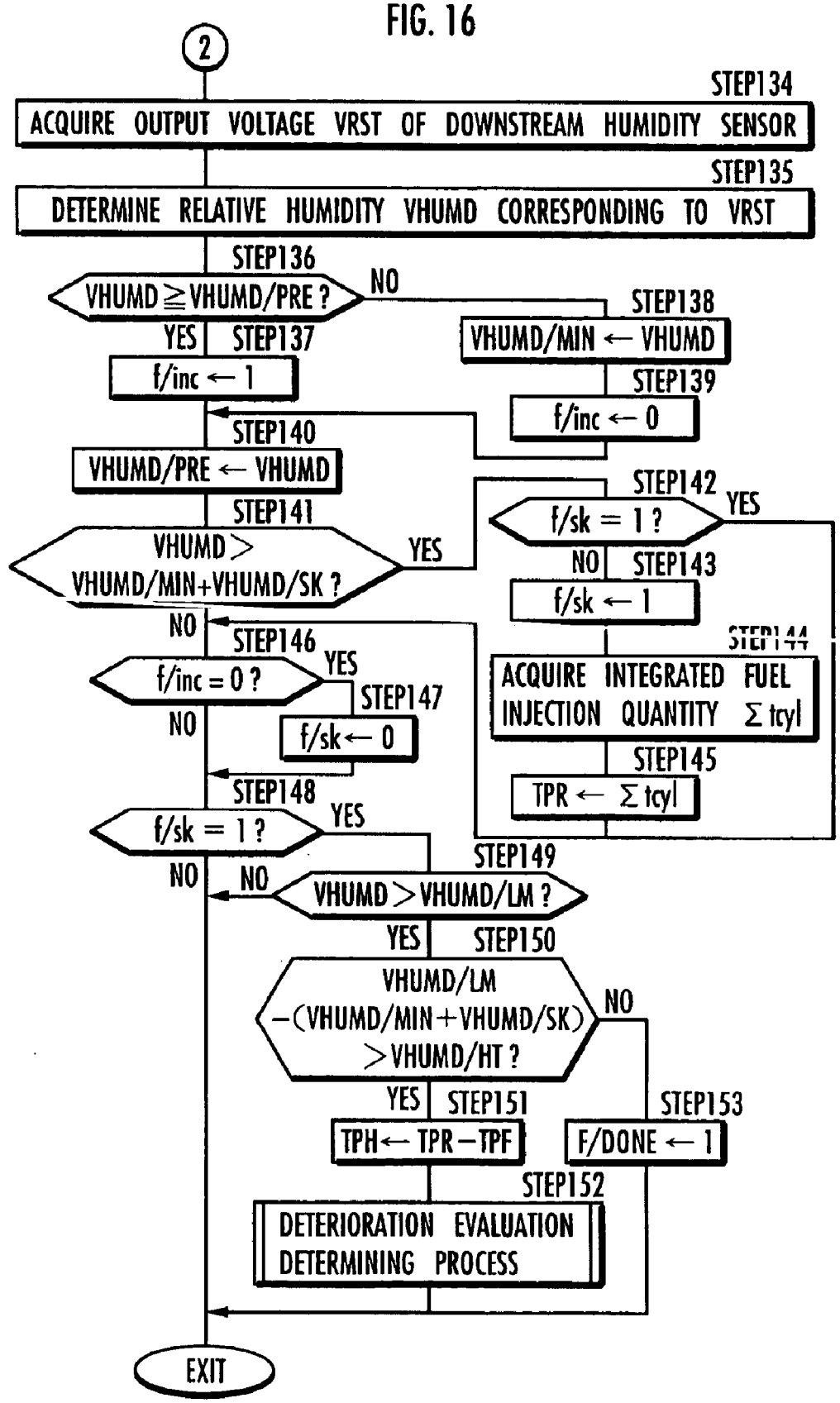

After having executed the routine shown in FIG. 14 at the time when the engine 1 starts to operate, the deterioration evaluating device 17 performs a processing sequence shown in FIGS. 15 and 16 in a predetermined cycle time.

In STEP111, STEP112, the deterioration evaluating device 17 determines the values of the flags F/DONE, F/MCND in the same manner as with the first embodiment. The meanings of these flags F/DONE, F/MCND are identical to those in the first embodiment. If F/DONE=1 in STEP111, then the processing sequence shown in FIGS. 15 and 16 is put to an end. If F/MCND=0 in STEP112, then the deterioration evaluating device 17 sets the value of the flag F/DONE to "1" in STEP113, after which the processing sequence shown in FIGS. 15 and 16 is put to an end. The processing in STEP111 through STEP113 is identical to the processing in STEP11 through STEP13 shown in FIG. 5.

If F/MCND=1 in STEP112, then the deterioration evaluating device 17 determines the value of a flag F/FEND in STEP114. The flag F/FEND has a value "1" when a changing timing (adsorption start timing) relative to the upstream humidity sensor 20 is detected and determined, and a value "0" when a changing timing (adsorption start timing) relative to the upstream humidity sensor 20 is not detected and determined. The flag F/FEND is initialized to "0" when the engine 1 starts operating. If F/FEND=1 in STEP114, the deterioration evaluating device 17 performs the processing from STEP134 shown in FIG. 16. If F/FEND=0, then the deterioration evaluating device 17 performs the processing in STEP115 through STEP133 relative to the upstream humidity sensor 20. The processing in STEP115 through STEP133 represents a process of detecting an upstream changing timing when the humidity VFHUM (relative humidity) represented by the output voltage VFST of the upstream humidity sensor 20 changes from a low humidity to a tendency to increase monotonously to a higher humidity, and corresponds to the processing in STEP14 through STEP32 shown in FIGS. 5 and 6 which has been described above in the first embodiment with respect to the downstream humidity sensor 19.

The processing in STEP115 through STEP133 will be described below. In step S115, the deterioration evaluating device 17 acquires the present data of the output voltage VFST of the upstream humidity sensor 19. Then, the deterioration evaluating device 17 determines a present relative humidity VFHUM corresponding to the output voltage VFST in STEP116. The relative humidity VFHUM can be determined from the value of the output voltage VFST acquired in STEP115 based on a data table or a formula representative of the output characteristics of the upstream humidity sensor 20.

Then, the deterioration evaluating device 17 compares the value of the relative humidity VFHUM upstream of the HC adsorbent 7 and the preceding relative humidity parameter VFHUM/PRE relative to the upstream humidity sensor 20 with each other in STEP117. If VFHUM≧VFHUM/PRE, then the deterioration evaluating device 17 sets the value of a flag f/finc to "1" in STEP118. The flag f/finc is "1" when the humidity represented by the output voltage of the upstream humidity sensor 20 is increasing, and the flag f/finc is "0" when the humidity represented by the output voltage of the upstream humidity sensor 20 is decreasing. Thereafter, the deterioration evaluating device 17 performs the processing in STEP121. If VFHUM<VFHUM/PRE, then the deterioration evaluating device 17 updates the value of the minimum humidity parameter VFHUM/MIN relative to the upstream humidity sensor 19 with the latest value of the relative humidity VFHUM determined in STEP116 in STEP119. Then, the deterioration evaluating device 17 sets the value of the flag f/finc to "0" indicating that the relative humidity VFHUM upstream of the HC adsorbent 7 is decreasing in STEP120. Then, the deterioration evaluating device 17 performs the processing in STEP121.

According to the processing in STEP115 through STEP120, therefore, while the relative humidity VFHUM detected by the upstream humidity sensor 20 is decreasing, the value of the minimum humidity parameter VFHUM/MIN is updated in each cycle time of the processing sequence of the deterioration evaluating device 17. While the relative humidity VFHUM is increasing, the value of the minimum humidity parameter VFHUM/MIN is not updated, but held to the minimum value of the relative humidity VFHUM (latest minimum value) immediately before the relative humidity VFHUM starts increasing.

In STEP121, the deterioration evaluating device 17 updates the value of the preceding relative humidity parameter VFHUM/PRE relative to the upstream humidity sensor 20 with the latest value of the relative humidity VFHUM determined in STEP116. Thereafter, the deterioration evaluating device 17 compares the latest value of the relative humidity VFHUM with a value (=VFHUM/MIN+VFHUM/SK, hereinafter referred to as "upstream temporary increase judgement threshold") which is the sum of the present value of the minimum humidity parameter VFHUM/MIN and a predetermined quantity VFHUM/SK (see FIG. 17 which will be described later on) in STEP122. The predetermined quantity VFHUM/SK relative to the upstream temporary increase judgement threshold corresponds to the predetermined quantity VHUMD/SK (see FIG. 8) described above in the first embodiment with respect to the downstream humidity sensor 19. Since the upstream humidity sensor 20 and the downstream humidity sensor 19 have substantially the same characteristics in the present embodiment, the predetermined quantity VFHUM/SK relative to the upstream temporary increase judgement threshold is set to the same value as the predetermined quantity VHUMD/SK (see FIG. 8) described above in the first embodiment with respect to the downstream humidity sensor 19, for example. However, the predetermined quantity VFHUM/SK may not necessarily be the same as the predetermined quantity VHUMD/SK, but their values may experimentally be determined separately in view of the transition of the actual relative humidities upstream and downstream of the HC adsorbent 7.

If VFHUM≦the upstream temporary increase judgement threshold in STEP122, then the deterioration evaluating device 17 performs a decision process in STEP127 as described later on. If VFHUM>the upstream temporary increase judgement threshold, then the deterioration evaluating device 17 determines the value of a flag f/fsk in STEP123. The flag f/fsk is set to "1" indicating that the relative humidity VFHUM temporarily changes from the minimum value to a tendency to increase monotonously, if the relative humidity VFHUM upstream of the HC adsorbent 7 is increasing (f/finc=1) and the relative humidity VFHUM in the preceding cycle time is VFHUM≦the upstream temporary increase judgement threshold, at the time when the relative humidity VFHUM in the present cycle time becomes VFHUM>the upstream temporary increase judgement threshold. The flag f/fsk is set to "0" at all times if the relative humidity VFHUM is decreasing (f/finc=0). After the flag f/fsk is set to "1", it will be held to "1" insofar as the increasing state of the relative humidity VFHUM continues. Therefore, the time in the cycle time at which the value of the flag f/fsk changes from "0" to "1" corresponds to an upstream temporary changing timing (adsorption start timing) in the second aspect of the present invention. The flag f/fsk has an initial value of "0".

If f/fsk=0 in STEP123, i.e., if the relative humidity VFHUM upstream of the HC adsorbent 7 changes from the decreasing state to the increasing state, takes a minimum value, thereafter keeps increasing and exceeds the upstream temporary increase judgement threshold which is the sum of the minimum value and the predetermined quantity VFHUM/SK, then the deterioration evaluating device 17 sets the value of the flag f/fsk to "1" in STEP124. The deterioration evaluating device 17 judges that the present cycle time is an upstream temporary changing timing (adsorption start timing), and acquires the data of the present value of the integrated fuel injection quantity Σtcyl from the ECU 16 in STEP125. Then, the deterioration evaluating device 17 stores the value of the integrated fuel injection quantity Σtcyl temporarily as the value of an integrated fuel injection quantity TPF (hereinafter referred to as "adsorption starting integrated fuel injection quantity TPF") at the adsorption start timing of the HC adsorbent 7 in STEP126. The adsorption starting integrated fuel injection quantity TPF means a total amount of moisture in the exhaust gas which has been generated by the engine 1 from the start of operation of the engine 1 to the upstream changing timing. Then, the deterioration evaluating device 17 performs a decision process in STEP127. If f/fsk=1 in STEP123, then the processing in STEP124 through STEP126 is skipped, and the decision process in STEP127 is performed.

In the decision process in STEP127, the deterioration evaluating device 17 determines the present value of the flag f/finc. If f/finc=0 indicating that the relative humidity VFHUM upstream of the HC adsorbent 7 is decreasing, then since the relative humidity VFHUM is not in a monotonously increasing state, the deterioration evaluating device 17 sets the value of the flag f/fsk to "0" in STEP128, and then performs a decision process in STEP129. If f/finc=1, then the deterioration evaluating device 17 keeps the value of the flag f/fsk, and performs the decision process in STEP129.

Figure 17:
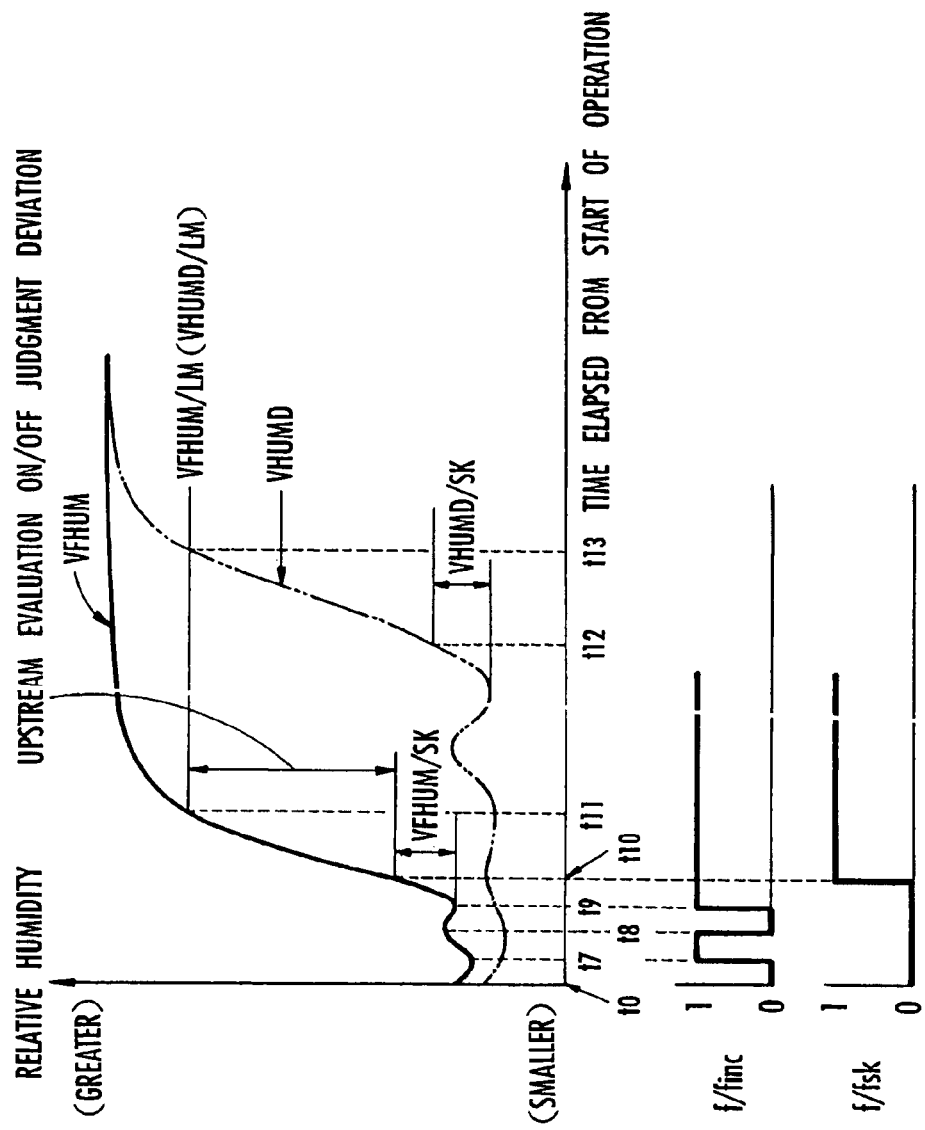
FIG. 17 is a diagram illustrative of the manner in which the deterioration evaluation processing apparatus according to the third embodiment of the present invention operates.

The manner in which the value of the flag f/finc and the value of the flag f/fsk that are set as described above change and the manner in which the relative humidity VFHUM detected by the upstream humidity sensor 20 changes will be described below with reference to FIG. 17. As described above, the relative humidity VFHUM upstream of the HC adsorbent 7 which is detected by the upstream humidity sensor 20 is in a low humidity range in a short period (a period between times t0 and t9 in FIG. 17, represented by the upper solid-line graph) immediately after the engine 1 has started to operate, i.e., in a period in which the exhaust gas containing much moisture reaches a region in the vicinity of the inlet of the HC adsorbent 7. In the above period, particularly if the HC adsorbent 7 is deteriorated to a certain extent, the humidity tends to vary due to variations in the humidity distribution in the exhaust pipe 5. When the exhaust gas containing much moisture reaches the inlet of the HC adsorbent 7 (at the time t9 in FIG. 17), the HC adsorbent 7 starts its essential adsorption of moisture in the exhaust gas, and the relative humidity VFHUM increases monotonously to a higher humidity due to the moisture contained in the exhaust gas, and finally converges to a substantially maximum humidity (relative humidity of about 100%) that can be grasped by the humidity sensor 20. The solid-line graph in FIG. 17 represents an example when variations in the relative humidity VFHUM detected by the upstream humidity sensor 20 in the period (the period between the times t0, t9) immediately after the engine 1 has started to operate are of an ordinary level, for illustrative purposes in the present embodiment. The imaginary-line graph in FIG. 17 represents by way of example a transition of the relative humidity VHUMD detected by the downstream humidity sensor 19 in the present embodiment.

When the relative humidity VFHUM detected by the upstream humidity sensor 20 undergoes such a transition, as shown by a middle graph in FIG. 17, the value of the flag f/finc is set to "0" in periods (a period between times t0 and t7 and a period between times t8 and t9) in which the relative humidity VFHUM is decreasing, and set to "1" in periods (a period between the times t7 and t8 and a period after the time t9) in which the relative humidity VFHUM is increasing (or constant). As shown by a lower graph in FIG. 17, the value of the flag f/fsk is changed from "0" to "1" at a time t10 when the relative humidity VFHUM exceeds the upstream temporary increase judgement threshold which is the sum of the minimum value of the relative humidity VFHUM at the time t9 and the predetermined quantity VFHUM/SK. According to the example of the solid-line graph shown in FIG. 17, after the time t10, since the relative humidity VFHUM keeps increasing, the value of the flag f/fsk is kept as "1". According to the example of the solid-line graph shown in FIG. 17, in this case, the time t10 is detected as a temporary upstream changing timing (adsorption saturation timing). Inasmuch as the relative humidity VFHUM does not decrease after the time t10 in the example of the solid-line graph shown in FIG. 17, the time t10 is finally determined as a true upstream changing timing.

Referring back to FIG. 15, in a decision process in STEP129, the deterioration evaluating device 17 determines the present value of the flag f/fsk. If f/fsk=0, i.e., if no upstream changing timing is detected or the relative humidity VFHUM upstream of the HC adsorbent 7 decreases after an upstream changing timing has temporarily been detected, then the deterioration evaluating device 17 performs a processing sequence from STEP134 to be described later on. If f/fsk=1 in STEP129, then the deterioration evaluating device 17 compares the present value of the upstream relative humidity VFHUM with a predetermined upper limit value VFHUM/LM (see FIG. 17) in STEP130. The upper limit value VFHUM/LM corresponds to the upper limit value VHUMD/LM described above in the first embodiment with respect to the downstream humidity sensor 19, and is set to the same value as the upper limit value VHUMD/LM relative to the downstream humidity sensor 19 in the present embodiment. Specifically, the upper limit value VFHUM/LM is a value close to, and slightly smaller than, a steady value that is finally reached (converged to) by the relative humidity VFHUM upstream of the HC adsorbent 7 as it increases after an upstream changing timing. If VFHUM≦VFHUM/LM (before a time t11 in FIG. 17) in STEP130, the relative humidity VFHUM is not yet sufficiently increased. In this case, the deterioration evaluating device 17 performs the processing from STEP134.

If VFHUM>VFHUM/LM in STEP130, then the deterioration evaluating device 17 compares the deviation (=VFHUM/LM−(VFHUM/MIN+VFHUM/SK), hereinafter referred to as "upstream evaluation on/off judgement deviation") between the upper limit value VFHUM/LM and the present value of the upstream temporary increase judgement threshold (=VFHUM/MIN+VFHUM/SK) with a predetermined lower limit value VFHUM/HT in STEP131. If the upstream evaluation on/off judgement deviation>VFHUM/HT, then the deterioration evaluating device 17 judges that the upstream temporary changing timing (adsorption start timing) at which the value of the flag f/fsk has finally changed from "0" to "1" is a true upstream changing timing sets the value of the flag F/FEND (whose value is determined in STEP114) to "1" in STEP 132, and carries out the processing from STEP134 to be described later on. The value of the adsorption starting integrated fuel injection quantity TPF determined in STEP126, i.e., the integrated fuel injection quantity Σtcyl at which the temporary upstream changing timing has finally been detected, will subsequently be held unchanged.

If the upstream evaluation on/off judgement deviation≦VFHUM/HT in STEP131, then since the increase of the relative humidity VFHUM from the temporary upstream changing timing is too small and that upstream changing timing is not reliable enough as an adsorption start timing, the deterioration evaluating device 17 judges that an evaluation of the deteriorated state of the HC adsorbent 7 is completed in the present cycle of operation of the engine 1, and sets the value of the flag F/DONE to "1" in STEP133. Thereafter, the deterioration evaluating device 17 puts the processing sequence shown in FIGS. 15 and 16 to an end. The situation where the upstream evaluation on/off judgement deviation≦VFHUM/HT in STEP133 represents a state in which the relative humidity VFHUM upstream of the HC adsorbent 7 tends to increase as a whole while varying due to disturbances or the like after the upstream changing timing.

The processing in STEP115 through STEP133 as described above represents a process of detecting and determining an upstream changing timing and acquiring an adsorption starting integrated fuel injection quantity TPF at the determined true upstream changing timing. According to such a process, the time t10 is determined as a true upstream changing timing (adsorption start timing) in the example of the solid-line graph shown in FIG. 17, for example. The integrated fuel injection quantity Σtcyl that is determined from the start of operation of the engine 1 to the time t10 is determined as the adsorption starting integrated fuel injection quantity TPF.

Of the processing in STEP115 through STEP133, the processing in STEP115 through STEP131, STEP133 except STEP132 corresponds to the processing in STEP14 through STEP30, STEP32 (see FIGS. 5 and 6) according to the first embodiment. The processing in STEP115 through STEP133 thus represents a process to be carried with respect to the upstream humidity sensor 20 in the same manner as the process of detecting and determining a changing timing (a downstream changing timing) relative to the downstream humidity sensor 19 described above according to the first embodiment, and acquiring an integrated fuel injection quantity Σtcyl up to the changing timing.

In the processing from STEP134 shown in FIG. 16, the deterioration evaluating device 17 performs the same process as in STEP14 through STEP30 shown in FIGS. 5 and 6 described above according to the first embodiment, in STEP134 through STEP150. According to the present embodiment, however, in STEP145 (corresponding to STEP25 shown in FIG. 5), the integrated fuel injection quantity Σtcyl at the temporary downstream changing timing (adsorption saturation timing) is stored, not as a deterioration evaluating parameter, but as the value of an adsorption saturating integrated fuel injection quantity TPR from the start of operation of the engine 1 up to the downstream changing timing (which means a total amount of moisture in the exhaust gas which has been generated by the engine 1 from the start of operation of the engine 1 up to the temporary downstream changing timing).

As with the first embodiment, if the answer to STEP150 is YES, i.e., if the evaluation on/off judgement deviation (=VHUMD/LM−(VHUMD/SK+VHUMD/MIN) relative to the downstream humidity sensor 19>VHUMD/HT, then the temporary downstream changing timing is determined as a true downstream changing timing. For example, according to the example of the imaginary-line graph show in FIG. 17, the answer to STEP150 is YES in the cycle time a the time t13, and at this time a time t12 is determined as a true downstream changing timing. In this case, the deterioration evaluating device 17 determines a value that is produced by subtracting the adsorption starting integrated fuel injection quantity TPF finally obtained in STEP126 shown in FIG. 15 from the adsorption saturating integrated fuel injection quantity TPR which is the integrated fuel injection quantity Σtcyl at the true downstream changing timing, as a deterioration evaluating parameter TPH in STEP151. The deterioration evaluating parameter TPH thus determined corresponds to an integrated amount of moisture that is essentially adsorbed by the HC adsorbent 7 from the true upstream changing timing (adsorption start timing) to the true downstream changing timing (adsorption saturation timing).

If the evaluation on/off judgement deviation ≦VHUMD/HT in STEP150, then since the reliability of the temporary downstream changing timing that has finally been detected is low, the deterioration evaluating device 17 sets the value of the flag F/DONE to "1" in STEP153 and puts the processing sequence shown in FIGS. 15 and 16 to an end in the same manner as with the first embodiment.

If the answer to STEP150 is YES and the deterioration evaluating parameter TPH is determined in STEP151, then the deterioration evaluating device 17 carries out a deterioration evaluation determining process for determining an evaluation of the deteriorated state of the HC adsorbent 7 in STEP152, and thereafter puts the processing sequence shown in FIGS. 15 and 16 to an end. The deterioration evaluation determining process in STEP152 is exactly the same as the deterioration evaluation determining process according to the first embodiment, and is carried out according to the processing sequence shown in FIG. 7. In this case, the deterioration evaluating threshold TRSDT determined in STEP91 shown in FIG. 14 i.e., determined based on the imaginary-line data table shown in FIG. 4, is employed.

According to the process carried out by the deterioration evaluating device 17 as described above, a true upstream changing timing as an adsorption start timing of the HC adsorbent 7 and a true downstream changing timing as an adsorption saturation timing of the HC adsorbent 7 can appropriately be detected. The deviation (TPR−TPF) that is produced by subtracting the integrated fuel injection quantity Σtcyl (=the adsorption starting integrated fuel injection quantity TPF) at the upstream changing timing from the integrated fuel injection quantity Σtcyl (=the adsorption saturating integrated fuel injection quantity TPR) at the downstream changing timing is employed as a deterioration evaluating parameter TPH, and the deterioration evaluating parameter TPH is compared with the deterioration evaluating threshold TRSDT to evaluate a deteriorated state of the HC adsorbent 7. Therefore, even when the adsorption start timing (the upstream changing timing) varies due to the catalytic converter 6 or the like upstream of the HC adsorbent 7, a deterioration evaluating parameter TPH can accurately be obtained which corresponds to a maximum amount of moisture that is actually adsorbed by the HC adsorbent 7.

As a result, the reliability of the result representing the deteriorated state of the HC adsorbent 7 is further increased. Only if both an true upstream changing timing and a true downstream changing timing can be determined (if the answers to STEP131, STEP150 are YES), the deterioration evaluation determining process for determining an evaluation of the deteriorated state of the HC adsorbent 7 is performed. This is also effective to increase the reliability of the result representing the deteriorated state of the HC adsorbent 7.

In the above third embodiment, the output voltages VRST, VFST of the respective humidity sensors 19, 20 are converted into the respective relative humidities VHUMD, VFHUM to detect an upstream changing timing and a downstream changing timing. However, as with the second embodiment, the output voltages VRST, VFST of the respective humidity sensors 19, 20 may directly be used to detect an upstream changing timing and a downstream changing timing.

In the first through third embodiments, in view of a situation where the relative humidity VHUMD (the relative humidity detected by the humidity sensor 19) downstream of the HC adsorbent 7 varies relatively greatly before the downstream changing timing, even when the relative humidity VHUMD increases from a minimum value by the predetermined quantity VHUMD/SK or more, the time at which such an increases occurs is not immediately determined as a downstream changing timing. However, if variations of the relative humidity VHUMD before the downstream changing timing are not so large owing to the structure of the exhaust system or the like, then the time at which the relative humidity VHUMD increases from a minimum value by the predetermined quantity VHUMD/SK or more may be immediately determined as a true downstream changing timing. This also holds for the detection of an upstream changing timing according to the third embodiment.

Industrial Applicability:

As described above, the present invention is useful as an apparatus for appropriately evaluating a deteriorated state of an HC adsorbent disposed in the exhaust system of an internal combustion engine that is mounted on an automobile or the like.

What is claimed is:

1. A method of evaluating a deteriorated state of an exhaust gas purifier disposed in an exhaust passage of an internal combustion engine and having a hydrocarbon adsorbent for adsorbing hydrocarbons in an exhaust gas flowing through the exhaust passage, comprising the steps of:

sequentially generating a deterioration evaluating parameter representative of an integrated amount of moisture that is supplied to said hydrocarbon adsorbent by said exhaust gas, after said internal combustion engine has started to operate; and sequentially searching for a state in which a humidity downstream of said hydrocarbon adsorbent takes a minimum value, and detecting a changing timing at which said humidity changes from the state in which the humidity takes a minimum value to a monotonously increasing state;

wherein a deteriorated state of said hydrocarbon adsorbent is evaluated based on the value of the deterioration evaluating parameter at said changing timing.

2. A method according to claim 1, wherein said step of sequentially generating a deterioration evaluating parameter comprises the steps of sequentially integrating data representative of an amount of moisture contained in the exhaust gas produced by said internal combustion engine from the time when said internal combustion engine starts to operate, and generating an integrated value as the deterioration evaluating parameter.

3. A method according to claim 1, wherein a value of the deterioration evaluating parameter at said changing timing is compared with a predetermined threshold which is established depending on the temperature of said hydrocarbon adsorbent at the time when said internal combustion engine starts to operate, for thereby evaluating the deteriorated state of said hydrocarbon adsorbent.

4. A method according to claim 1, wherein said step of detecting a changing timing comprises the step of detecting a time when the humidity downstream of said hydrocarbon adsorbent increases a predetermined quantity or more from said minimum value after the humidity has taken the minimum value, as said changing timing.

5. A method according to claim 1, wherein said step of detecting a changing timing comprises the steps of storing the value of said deterioration evaluating parameter at a time, regarded as a temporary changing timing, when the humidity downstream of said hydrocarbon adsorbent increases a predetermined quantity or more from said minimum value after the humidity has taken the minimum value, and thereafter determining said temporary changing timing as a true changing timing when the humidity increases to a predetermined upper limit value without taking a minimum value.

6. A method according to claim 5, wherein the deteriorated state of said hydrocarbon adsorbent is evaluated based on the value of the deterioration evaluating parameter at said true changing timing only if the difference between a value which is the sum of said minimum value immediately prior to said temporary changing timing and said predetermined quantity, and said predetermined upper limit value is equal to or greater than a predetermined lower limit value, when said temporary changing timing is determined as said true changing timing.

7. A method of evaluating a deteriorated state of an exhaust gas purifier disposed in an exhaust passage of an internal combustion engine and having a hydrocarbon adsorbent for adsorbing hydrocarbons in an exhaust gas flowing through the exhaust passage, comprising the steps of:

sequentially searching for a state in which a humidity upstream of said hydrocarbon adsorbent takes a minimum value, and detecting a timing at which said humidity changes from the state in which the humidity takes a minimum value to a monotonously increasing state as an upstream changing timing, after said internal combustion engine has started to operate;

sequentially searching for a state in which a humidity downstream of said hydrocarbon adsorbent takes a minimum value, and detecting a timing at which said humidity changes from the state in which the humidity takes a minimum value to a monotonously increasing state as a downstream changing timing; and generating a deterioration evaluating parameter representative of an integrated amount of moisture that is supplied to said hydrocarbon adsorbent by the exhaust gas from said internal combustion engine from said upstream changing timing to said downstream changing timing;

wherein a deteriorated state of said hydrocarbon adsorbent is evaluated based on the value of the deterioration evaluating parameter.

8. A method according to claim 7, wherein said step of sequentially generating a deterioration evaluating parameter comprises the steps of sequentially integrating data representative of an amount of moisture contained in the exhaust gas produced by said internal combustion engine from the time when said internal combustion engine starts to operate, and determining the deviation between an integrated value at said upstream changing timing and an integrated value at said downstream changing timing, as the deterioration evaluating parameter.

9. A method according to claim 7, wherein the deteriorated state of said hydrocarbon adsorbent is evaluated by comparing the value of said deterioration evaluating parameter with a predetermined threshold that is established depending on the temperature of said hydrocarbon adsorbent at the time when said internal combustion engine starts to operate.

10. A method according to claim 7, wherein said step of detecting an upstream changing timing comprises the step of detecting a time when the humidity upstream of said hydrocarbon adsorbent increases a first predetermined quantity or more from said minimum value after the humidity has taken the minimum value, as said upstream changing timing, and said step of detecting a downstream changing timing comprises the step of detecting a time when the humidity downstream of said hydrocarbon adsorbent increases a second predetermined quantity or more from said minimum value after the humidity has taken the minimum value, as said downstream changing timing.

11. A method according to claim 7, wherein said step of detecting an upstream changing timing comprises the steps of detecting a time when the humidity upstream of said hydrocarbon adsorbent increases a first predetermined quantity or more from said minimum value after the humidity has taken the minimum value, as a temporary upstream changing timing, and thereafter determining said temporary upstream changing timing as a true upstream changing timing when the humidity upstream of said hydrocarbon adsorbent increases to a predetermined first upper limit value without taking a minimum value, and wherein said step of detecting a downstream changing timing comprises the steps of detecting a time when the humidity downstream of said hydrocarbon adsorbent increases a second predetermined quantity or more from said minimum value after the humidity has taken the minimum value, as a temporary downstream changing timing, and thereafter determining said temporary downstream changing timing as a true downstream changing timing when the humidity downstream of said hydrocarbon adsorbent increases to a predetermined second upper limit value without taking a minimum value.

12. A method according to claim 11, wherein the deteriorated state of said hydrocarbon adsorbent is evaluated based on the value of the deterioration evaluating parameter representing said integrated amount of moisture from said true downstream changing timing to said upstream changing timing only if the difference between a value which is the sum of the minimum value of the humidity upstream of said hydrocarbon adsorbent immediately prior to said temporary upstream changing timing and said first predetermined quantity, and said predetermined first upper limit value is equal to or greater than a predetermined first lower limit value, and if the difference between a value which is the sum of the minimum value of the humidity downstream of said hydrocarbon adsorbent immediately prior to said temporary downstream changing timing and said second predetermined quantity, and said predetermined second upper limit value is equal to or greater than a predetermined second lower limit value, when said temporary upstream changing timing is determined as said true upstream changing timing and said temporary downstream changing timing is determined as said true downstream changing timing.

13. An apparatus for evaluating a deteriorated state of an exhaust gas purifier disposed in an exhaust passage of an internal combustion engine and having a hydrocarbon adsorbent for adsorbing hydrocarbons in an exhaust gas flowing through the exhaust passage, comprising:
 a humidity sensor disposed downstream of said hydrocarbon adsorbent for outputting a signal depending on the humidity of said exhaust gas;
 means for sequentially generating a deterioration evaluating parameter representative of an integrated amount of moisture that is supplied to said hydrocarbon adsorbent by said exhaust gas, after said internal combustion engine has started to operate; and
 means for sequentially searching for a state in which the humidity represented by an output of said humidity sensor takes a minimum value, and detecting a changing timing at which said humidity changes from the state in which the humidity takes a minimum value to a monotonously increasing state, after said internal combustion engine has started to operate;
 wherein a deteriorated state of said hydrocarbon adsorbent is evaluated based on the value of the deterioration evaluating parameter at said changing timing.

14. An apparatus according to claim 13, wherein said means for sequentially generating a deterioration evaluating parameter sequentially integrates data representative of an amount of moisture contained in the exhaust gas produced by said internal combustion engine from the time when said internal combustion engine starts to operate, and generates an integrated value as the deterioration evaluating parameter.

15. An apparatus according to claim 13, wherein a value of the deterioration evaluating parameter at said changing timing is compared with a predetermined threshold which is established depending on the temperature of said hydrocarbon adsorbent at the time when said internal combustion engine starts to operate, for thereby evaluating the deteriorated state of said hydrocarbon adsorbent.

16. An apparatus according to claim 13, wherein said means for detecting a changing timing detects a time when the humidity represented by the output of said humidity sensor increases a predetermined quantity or more from said minimum value after the humidity has taken the minimum value, as said changing timing.

17. An apparatus according to claim 13, wherein said means for detecting a changing timing stores the value of said deterioration evaluating parameter at a time, regarded as a temporary changing timing, when the humidity represented by the output of said humidity sensor increases a predetermined quantity or more from said minimum value after the humidity has taken the minimum value, and thereafter determines said temporary changing timing as a true changing timing when the humidity represented by the output of said humidity sensor increases to a predetermined upper limit value without taking a minimum value.

18. An apparatus according to claim 17, wherein the deteriorated state of said hydrocarbon adsorbent is evaluated based on the value of the deterioration evaluating parameter at said true changing timing only if the difference between a value which is the sum of said minimum value immediately prior to said temporary changing timing and said predetermined quantity, and said predetermined upper limit value is equal to or greater than a predetermined lower limit value, when said temporary changing timing is determined as said true changing timing.

19. An apparatus for evaluating a deteriorated state of an exhaust gas purifier disposed in an exhaust passage of an internal combustion engine and having a hydrocarbon adsorbent for adsorbing hydrocarbons in an exhaust gas flowing through the exhaust passage, comprising:
- a downstream humidity sensor and an upstream humidity sensor disposed respectively downstream and upstream of said hydrocarbon adsorbent for outputting signals depending on the humidity of said exhaust gas;
- means for sequentially searching for a state in which the humidity represented by an output of said upstream humidity sensor takes a minimum value, and detecting a timing at which said humidity changes from the state in which the humidity takes a minimum value to a monotonously increasing state as an upstream changing timing, after said internal combustion engine has started to operate;
- means for sequentially searching for a state in which the humidity represented by an output of said downstream humidity sensor takes a minimum value, and detecting a timing at which said humidity changes from the state in which the humidity takes a minimum value to a monotonously increasing state as a downstream changing timing, after said internal combustion engine has started to operate; and
- means for generating a deterioration evaluating parameter representative of an integrated amount of moisture that is supplied to said hydrocarbon adsorbent by the exhaust gas from said internal combustion engine from said upstream changing timing to said downstream changing timing;
- wherein a deteriorated state of said hydrocarbon adsorbent is evaluated based on the value of the deterioration evaluating parameter.

20. An apparatus according to claim 19, wherein said means for sequentially generating a deterioration evaluating parameter sequentially integrates data representative of an amount of moisture contained in the exhaust gas produced by said internal combustion engine from the time when said internal combustion engine starts to operate, and determines the deviation between an integrated value at the changing timing relative to said upstream humidity sensor and an integrated value at the changing timing relative to said downstream humidity sensor, as the deterioration evaluating parameter.

21. An apparatus according to claim 19, wherein the deteriorated state of said hydrocarbon adsorbent is evaluated by comparing the value of said deterioration evaluating parameter with a predetermined threshold that is established depending on the temperature of said hydrocarbon adsorbent at the time when said internal combustion engine starts to operate.

22. An apparatus according to claim 19, wherein said means for detecting an upstream changing timing detects a time when the humidity represented by the output of said upstream humidity sensor increases a first predetermined quantity or more from said minimum value after the humidity has taken the minimum value, as said upstream changing timing, and said means for detecting a downstream changing timing detects a time when the humidity represented by the output of said downstream humidity sensor increases a second predetermined quantity or more from said minimum value after the humidity has taken the minimum, as said downstream changing timing.

23. An apparatus according to claim 19, wherein said means for detecting an upstream changing timing detects a time when the humidity represented by the output of said upstream humidity sensor increases a first predetermined quantity or more from said minimum value after the humidity has taken the minimum value, as a temporary upstream changing timing, and thereafter determines said temporary upstream changing timing as a true upstream changing timing when the humidity represented by the output of said upstream humidity sensor increases to a predetermined first upper limit value without taking a minimum value, and wherein said means for detecting a downstream changing timing detects a time when the humidity represented by the output of said downstream humidity sensor increases a second predetermined quantity or more from said minimum value after the humidity has taken the minimum value, as a temporary downstream changing timing, and thereafter determines said temporary downstream changing timing as a true downstream changing timing when the humidity represented by the output of said downstream humidity sensor increases to a predetermined second upper limit value without taking a minimum value.

24. An apparatus according to claim 23, wherein the deteriorated state of said hydrocarbon adsorbent is evaluated based on the value of the deterioration evaluating parameter representing said integrated amount of moisture from said true downstream changing timing to said upstream changing timing only if the difference between a value which is the sum of the minimum value of the humidity relative to said upstream humidity sensor immediately prior to said temporary upstream changing timing and said first predetermined quantity, and said predetermined first upper limit value is equal to or greater than a predetermined first lower limit value, and if the difference between a value which is the sum of the minimum value of the humidity relative to said downstream humidity sensor immediately prior to said temporary downstream changing timing and said second predetermined quantity, and said predetermined second upper limit value is equal to or greater than a predetermined second lower limit value, when said temporary upstream changing timing is determined as said true upstream changing timing and said temporary downstream changing timing is determined as said true downstream changing timing.

25. A recording medium readable by a computer and storing a program for enabling the computer to perform a process of evaluating a deteriorated state of an exhaust gas purifier disposed in an exhaust passage of an internal combustion engine and having a hydrocarbon adsorbent for adsorbing hydrocarbons in an exhaust gas flowing through the exhaust passage, said program including:
- a program for enabling said computer to perform a process of sequentially generating a deterioration evaluating parameter representative of an integrated amount of moisture that is supplied to said hydrocarbon adsorbent by said exhaust gas, after said internal combustion engine has started to operate, based on given operating state data of said internal combustion engine;
- a program for enabling said computer to perform a process of sequentially searching for a state in which a humidity downstream of said hydrocarbon adsorbent takes a minimum value, and detecting a changing timing at which said humidity changes from the state in which the humidity takes a minimum value to a monotonously increasing state, after said combustion engine has started to operate, based on given data representative of the humidity downstream of said hydrocarbon adsorbent; and
- a program for enabling said computer to perform a process of evaluating a deteriorated state of said hydrocarbon adsorbent based on the value of the deterioration evaluating parameter at said changing timing.

26. A recording medium according to claim 25, wherein said program for enabling said computer to perform a process of sequentially generating a deterioration evaluating parameter comprises a program for enabling said computer to perform a process of sequentially integrating data representative of an amount of moisture contained in the exhaust gas produced by said internal combustion engine from the time when said internal combustion engine starts to operate, and generating an integrated value as the deterioration evaluating parameter.

27. A recording medium according to claim 25, wherein said program for enabling said computer to perform a process of evaluating a deteriorated state of said hydrocarbon adsorbent comprises a program for enabling said computer to perform a process of evaluating a deteriorated state of said hydrocarbon adsorbent by comparing a value of the deterioration evaluating parameter at said changing timing with a predetermined threshold which is established depending on the temperature of said hydrocarbon adsorbent at the time when said internal combustion engine starts to operate.

28. A recording medium according to claim 25, wherein said program for enabling said computer to perform a process of detecting a changing timing comprises a program for enabling said computer to perform a process of detecting a time when the humidity downstream of said hydrocarbon adsorbent increases a predetermined quantity or more from said minimum value after the humidity has taken the minimum value, as said changing timing.

29. A recording medium according to claim 25, wherein said program for enabling said computer to perform a process of detecting a changing timing comprises a program for enabling said computer to perform a process of storing the value of said deterioration evaluating parameter at a time, regarded as a temporary changing timing, when the humidity downstream of said hydrocarbon adsorbent increases a predetermined quantity or more from said minimum value after the humidity has taken the minimum value, and thereafter determining said temporary changing timing as a true changing timing when the humidity increases to a predetermined upper limit value without taking a minimum value.

30. A recording medium according to claim 29, wherein said program for enabling said computer to perform a process of evaluating a deteriorated state of said hydrocarbon adsorbent comprises a program for enabling said computer to perform a process of evaluating the deteriorated state of said hydrocarbon adsorbent only if the difference between a value which is the sum of said minimum value immediately prior to said temporary changing timing determined as said true changing timing and said predetermined quantity, and said predetermined upper limit value is equal to or greater than a predetermined lower limit value.

31. A recording medium readable by a computer and storing a program for enabling the computer to perform a process of evaluating a deteriorated state of an exhaust gas purifier disposed in an exhaust passage of an internal combustion engine and having a hydrocarbon adsorbent for adsorbing hydrocarbons in an exhaust gas flowing through the exhaust passage, said program including:

a program for enabling said computer to perform a process of sequentially searching for a state in which a humidity upstream of said hydrocarbon adsorbent takes a minimum value, and detecting a timing at which said humidity changes from the state in which the humidity takes a minimum value to a monotonously increasing state as an upstream changing timing, after said internal combustion engine has started to operate, based on given data representative of the humidity upstream of said hydrocarbon adsorbent;

a program for enabling said computer to perform a process of sequentially searching for a state in which a humidity downstream of said hydrocarbon adsorbent takes a minimum value, and detecting a timing at which said humidity changes from the state in which the humidity takes a minimum value to a monotonously increasing state as a downstream changing timing, after said internal combustion engine has started to operate, based on given data representative of the humidity downstream of said hydrocarbon adsorbent;

a program for enabling said computer to perform a process of generating a deterioration evaluating parameter representative of an integrated amount of moisture that is supplied to said hydrocarbon adsorbent by the exhaust gas from said internal combustion engine from said upstream changing timing to said downstream changing timing, based on given operating state data of said internal combustion engine; and a program for enabling said computer to perform a process of evaluating a deteriorated state of said hydrocarbon adsorbent based on the value of the deterioration evaluating parameter.

32. A recording medium according to claim 31, wherein said program for enabling said computer to perform a process of generating a deterioration evaluating paramter comprises a program for enabling said computer to perform a process of sequentially integrating said operating state data, which are data representative of an amount of moisture contained in the exhaust gas produced by said internal combustion engine, from the time when said internal combustion engine starts to operate, and determining the deviation between an integrated value at said upstream changing timing and an integrated value at said downstream changing timing, as the deterioration evaluating parameter.

33. A recording medium according to claim 31, wherein said program for enabling said computer to perform a process of evaluating a deteriorated state of said hydrocarbon adsorbent comprises a program for enabling said computer to perform a process of evaluating the deteriorated state of said hydrocarbon adsorbent by comparing the value of said deterioration evaluating parameter with a predetermined threshold that is established depending on the temperature of said hydrocarbon adsorbent at the time when said internal combustion engine starts to operate.

34. A recording medium according to claim 31, wherein said program for enabling said computer to perform a process of detecting an upstream changing timing comprises a program for enabling said computer to perform a process of detecting a time when the humidity upstream of said hydrocarbon adsorbent increases a first predetermined quantity or more from said minimum value after the humidity has taken the minimum value, as said upstream changing timing, and said program for enabling said computer to perform a process of detecting a downstream changing timing comprises a program for enabling said computer to perform a process of detecting a time when the humidity downstream of said hydrocarbon adsorbent increases a second predetermined quantity or more from said minimum value after the humidity has taken the minimum value, as said downstream changing timing.

35. A recording medium to claim 31, wherein said program for enabling said computer to perform a process of detecting an upstream changing timing comprises a program for enabling said computer to perform a process of detecting a time when the humidity upstream of said hydrocarbon adsorbent increases a first predetermined quantity or more from said minimum value after the humidity has taken the minimum value, as a temporary upstream changing timing, and thereafter determining said temporary upstream changing timing as a true upstream changing timing when the humidity upstream of said hydrocarbon adsorbent increases to a predetermined first upper limit value without taking a minimum value, and wherein said program for enabling said computer to perform a process of detecting a downstream changing timing comprises a program for enabling said computer to perform a process of detecting a time when the humidity downstream of said hydrocarbon adsorbent increases a second predetermined quantity or more from said minimum value after the humidity has taken the minimum value, as a temporary downstream changing timing, and thereafter determining said temporary downstream changing timing as a true downstream changing timing when the humidity downstream of said hydrocarbon adsorbent increases to a predetermined second upper limit value without taking a minimum value.

36. A recording medium according to claim 35, wherein said program for enabling said computer to perform a process of evaluating a deteriorated state of said hydrocarbon adsorbent comprises a program for enabling said computer to perform a process of evaluating the deteriorated state of said hydrocarbon adsorbent based on the value of the deterioration evaluating parameter representing said integrated amount of moisture from said true downstream changing timing to said upstream changing timing only if the difference between a value which is the sum of the minimum value of the humidity upstream of said hydrocarbon adsorbent immediately prior to said temporary upstream changing timing which is determined as said true upstream changing timing and said first predetermined quantity, and said predetermined first upper limit value is equal to or greater than a predetermined first lower limit value, and if the difference between a value which is the sum of the minimum value of the humidity downstream of said hydrocarbon adsorbent immediately prior to said temporary downstream changing timing which is determined as said true downstream changing timing and said second predetermined quantity, and said predetermined second upper limit value is equal to or greater than a predetermined second lower limit value.

* * * * *